US011629803B2

(12) United States Patent
Knapp

(10) Patent No.: US 11,629,803 B2
(45) Date of Patent: Apr. 18, 2023

(54) PIPE COUPLING ASSEMBLY

(71) Applicant: SpringSeal, Inc., Streetsboro, OH (US)

(72) Inventor: Mark Knapp, Ravenna, OH (US)

(73) Assignee: Springseal, Inc., Ravenna, OH (US)

( * ) Notice: Subject to any disclaimer, the term of this patent is extended or adjusted under 35 U.S.C. 154(b) by 566 days.

(21) Appl. No.: 16/845,632

(22) Filed: Apr. 10, 2020

(65) Prior Publication Data

US 2020/0332932 A1 Oct. 22, 2020

Related U.S. Application Data

(60) Provisional application No. 62/835,723, filed on Apr. 18, 2019.

(51) Int. Cl.
*F16L 21/08* (2006.01)
*F16G 11/10* (2006.01)

(52) U.S. Cl.
CPC .............. *F16L 21/08* (2013.01); *F16G 11/10* (2013.01)

(58) Field of Classification Search
CPC ..... F16L 21/08; F16L 21/005; F16L 25/0036; F16G 11/10
See application file for complete search history.

(56) References Cited

U.S. PATENT DOCUMENTS

| 3,464,721 | A | * | 9/1969 | Surko, Jr. | ............... F16L 33/03 285/236 |
| 5,626,349 | A | | 5/1997 | Sutherland et al. | |
| 7,469,905 | B2 | | 12/2008 | Knapp | |
| 7,503,992 | B2 | | 3/2009 | Knapp | |
| 8,727,387 | B2 | | 5/2014 | Knapp | |
| 2009/0295153 | A1 | * | 12/2009 | Knapp | ............... F16L 25/0036 285/331 |

* cited by examiner

*Primary Examiner* — David M Upchurch
(74) *Attorney, Agent, or Firm* — Tarolli, Sundheim, Covell & Tummino LLP; John A. Yirga, Esq.

(57) ABSTRACT

A locking mechanism for use with a coupler assembly for sealing pipe is described herein. The locking mechanism comprises a partially hollow cylindrical body having a first end opposite a second end along a common axis, the body defining a first cord path connecting the first end to a first arcuate opening defined in the body and a second cord path connecting the second end to a second arcuate opening defined in the body, wherein the first cord path and the second cord path comprise separate paths. The locking mechanism further comprising first and second caps that are slidably attachable to the first and second ends of the body, respectively and a cord having a first end portion located within the first cord path and a second end portion located within the second cord path.

20 Claims, 22 Drawing Sheets

PIPE COUPLING ASSEMBLY

CROSS REFERENCE TO RELATED APPLICATION

The present application is a non-provisional application that claims priority under 35 U.S.C. § 119(e) to co-pending U.S. Provisional Application Ser. No. 62/835,723 entitled PIPE COUPLING ASSEMBLY that was filed on Apr. 18, 2019 with the United States Patent Office, the present application claims priority to said provisional application which is incorporated by reference in its entirety herein for all purposes.

TECHNICAL FIELD

The present invention relates to a pipe coupling assembly for connecting two pieces of pipe or for positioning over an opening in a single pipe using a cord and locking mechanism, and more specifically, a pipe coupling assembly providing a fluid-tight connection between two pieces of piping or over an opening in a single pipe using a cord and locking mechanism.

BACKGROUND

It is desirable to form a fluid-tight seal between two pipe sections, including piping typically used for drainage, sanitary sewer applications, and water collecting on the surface and in the ground of agricultural, residential, and commercial properties. Historically, clay tile was used to achieve a desired drainage level. Clay tile is typically constructed in one or two foot sections and possesses many inherent deficiencies, such as, susceptibility to cracking, labor-intensive installation in placement of the sections in close proximity, and the significant amount of weight associated with each section.

The above deficiencies identified with clay tile are likely a cause for the more recent creation and popularity of using corrugated plastic piping (typically formed from polyethylene) for various drainage applications. The corrugations in the piping provide both strength and flexibility, allowing single continuous sections to extend in excess of one-hundred feet before connecting to a mating pipe section.

It is desirable to form a fluid-tight seal between the mating corrugated pipe sections. In order to form the mating connection, a special geometrical construct is typically required at the ends of the pipe sections to be joined. The typical geometrical construction of the sections includes one of the two ends of the pipe having an end formation for insertion, typically referred to as a spigot. A pipe receiving end formation for receiving the spigot end of a pipe is typically, referred to as a bell is designed to have an inner diameter greater than the outer diameter of the spigot, such that the spigot is inserted into the bell to form the fluid-tight seal.

It is not uncommon to place an elastomeric gasket around the outer diameter of the spigot that contacts the inner diameter of the bell, providing the fluid tight sealing connection as discussed further in U.S. Pat. No. 7,469,905 that issued Dec. 30, 2008 entitled PERMANENTLY LUBRICATED FILM GASKET AND METHOD OF MANUFACTURE assigned to the assignee of the present application, which is incorporated in its entirety herein by reference for all purposes. Other known pipe coupling assemblies are described in U.S. Pat. Nos. 5,626,408, 8,727,387, both entitled PIPE COUPLING ASSEMBLY assigned to the assignee of the present application, which is incorporated in its entirety herein by reference for all purposes. Typically, a clamping device such as a hose clamp is positioned and secured over the bell between gasket and opening end of the bell to assist in forming the fluid-tight seal.

A large friction force is typically encountered when the spigot, having an elastomeric gasket is inserted into the bell. As the spigot is being inserted, the gasket is at times pulled from its position by the large frictional force. Additionally, the bell or outer pipe of the mating pipe sections has a tendency to deflect away from the elastomeric gasket during insertion. The deflected area of the outer pipe or bell is often disposed to leaks and is further weakened with its exposure to fluid and/or fluid pressure.

SUMMARY

One example embodiment of the present disclosure includes a locking mechanism for use with a coupler assembly for sealing pipe is described herein. The locking mechanism comprises a partially hollow cylindrical body having a first end opposite a second end along a common axis, the body defining a first cord path connecting the first end to a first arcuate opening defined in the body and a second cord path connecting the second end to a second arcuate opening defined in the body, wherein the first cord path and the second cord path comprise separate paths. The locking mechanism further comprising first and second caps that are slidably attachable to the first and second ends of the body, respectively and a cord having a first end portion located within the first cord path and a second end portion located within the second cord path.

Another example embodiment of the present disclosure includes a method of making locking mechanism for use with a coupler assembly for sealing pipe, the method comprising the steps of forming a partially hollow cylindrical body having a first end opposite a second end along a common axis, defining first and second arcuate openings within the body, forming within the body a first cord path connecting the first end to the first arcuate opening. The method further includes forming within the body a second cord path, separate from the first cord path, connecting the second end to the second arcuate opening, forming a first tab coupled to the body and wherein responsive to a force over a force threshold being applied to the first tab, the first tab extends into and out of the first cord path, and forming a second tab that is coupled to the body and wherein responsive to the force over the force threshold being applied to the second tab, the second tab extends into and out of the second cord path.

Yet another example embodiment of the present disclosure includes a locking mechanism for use with a coupler assembly for sealing pipe comprising a partially hollow cylindrical body having a first end opposite a second end along a common axis, the body defining a first cord path connecting the first end to a first arcuate opening defined in the body, at least one of a first tab and a second tab along the first cord path, the at least one of the first tab and the second tab comprising a plurality of teeth that extend into the first cord path, the at least one of the first tab and the second tab flexibly connected to the body, wherein responsive to a force directed into the body, the at least one of the first tab and the second tab flexes into the first cord path and responsive to force directed out of the body the at least one of the first tab and the second tab flexes out of the first cord path. The body further defining a second cord path connecting the second end to a second arcuate opening defined in the body, wherein the first cord path and the second cord path comprise separate paths, and at least one of a third tab and a fourth tab along the second cord path, the at least one of the third tab and the fourth tab comprising a plurality of teeth that extend into the second cord path, at least one of the third tab and the fourth tab flexibly connected to the body, wherein responsive to the force directed into the body, the at least one of the third tab and the fourth tab flexes into the second cord path and responsive to force directed out of the body the at least one of the third tab and the fourth tab flexes out of the second cord path, the at least one of a first tab and the second tab spaced from the at least one of the third tab and the fourth tab by the first and second arcuate openings.

BRIEF DESCRIPTION OF THE DRAWINGS

The foregoing and other features and advantages of the present invention will become apparent to one skilled in the art to which the present invention relates upon consideration of the following description of the invention with reference to the accompanying drawings, wherein like reference numerals refer to like parts unless described otherwise throughout the drawings and in which.

DETAILED DESCRIPTION

The present invention relates to a pipe coupling assembly for connecting two pieces of pipe or over an opening in a single pipe using a cord and locking mechanism, and more specifically, a pipe coupling assembly providing a fluid-tight connection between two pieces of piping or over an opening in a single pipe using a cord and locking mechanism.

Figure 1A:
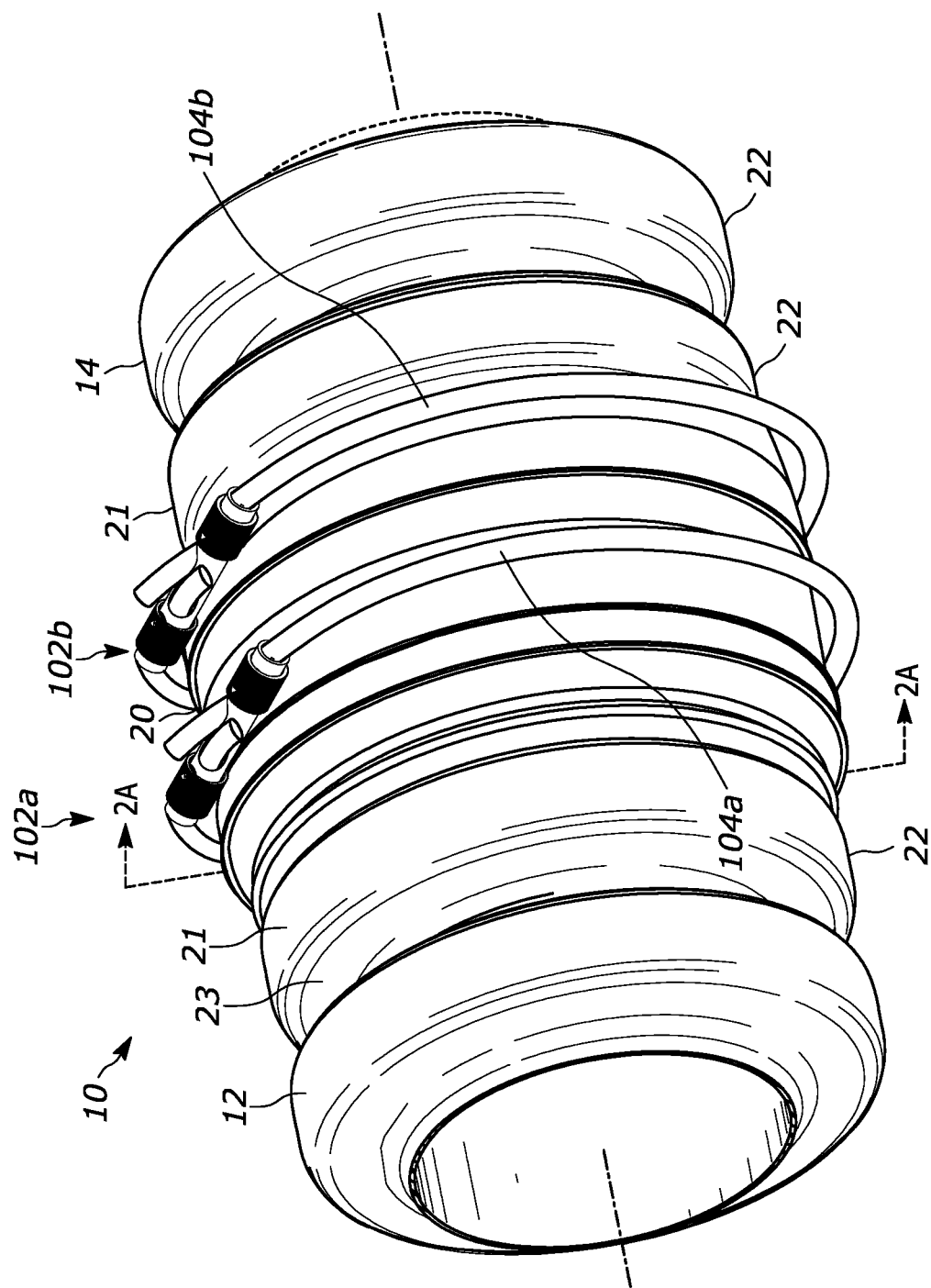
FIG. 1A is a perspective view of a pipe coupling assembly constructed in accordance with one embodiment of the disclosure forming a fluid-tight sealing connection between two corrugated pipe sections wherein a locking mechanism is not engaged.
Figure 1B:
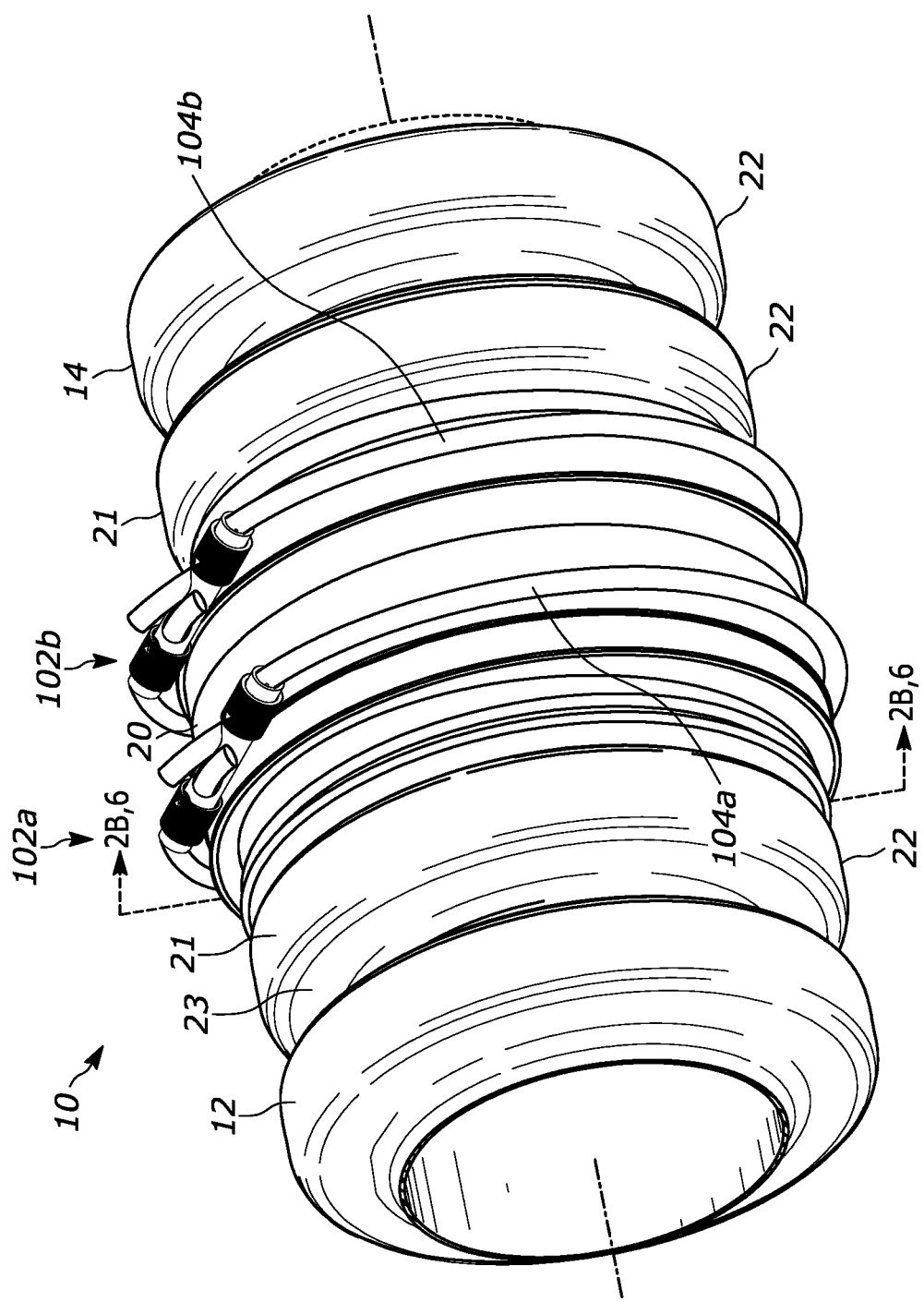
FIG. 1B is a perspective view of a pipe coupling assembly constructed in accordance with one embodiment of the disclosure forming a fluid-tight sealing connection between two corrugated pipe sections wherein a locking mechanism is engaged.

Referring to the figures, and in particular FIGS. 1A-1B, which are perspective views of a pipe coupling assembly 10 constructed in accordance with one embodiment of the disclosure forming a fluid-tight sealing connection between first and second pipe sections 12, 14, respectively.

While the first and second pipe sections 12, 14 in FIGS. 1A-1B illustrate corrugated piping constructions, the pipe coupling assemblies of the present disclosure are used to couple other types of piping, including for example, polyvinyl chloride (PVC), straight metal piping, and the like without departing from the spirit and scope of the claimed disclosure. In addition, the pipe coupling assemblies of the present disclosure are designed to connect sections of piping during fabrication at manufacturing facilities, during installation of the pipe at its designated site, or to repair broken or leaking connections in the field.

Figure 2A:
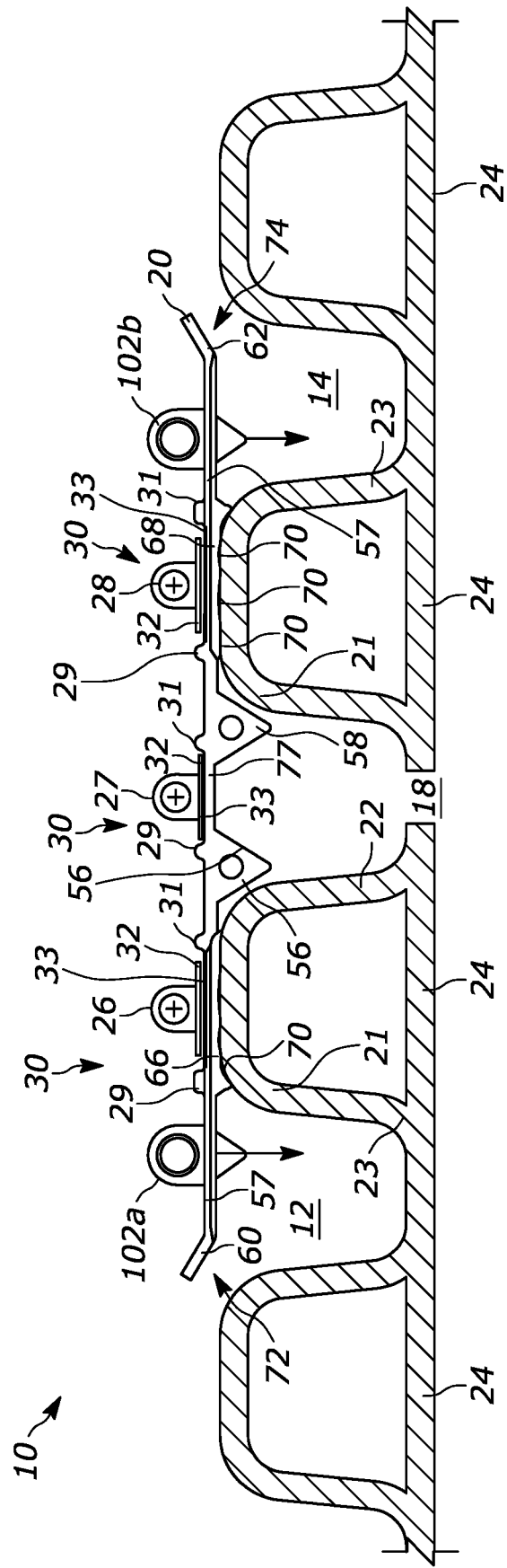
FIG. 2A is a partial sectional-side view of the pipe coupling assembly of FIG. 1A along section lines 2A-2A.
Figure 2B:
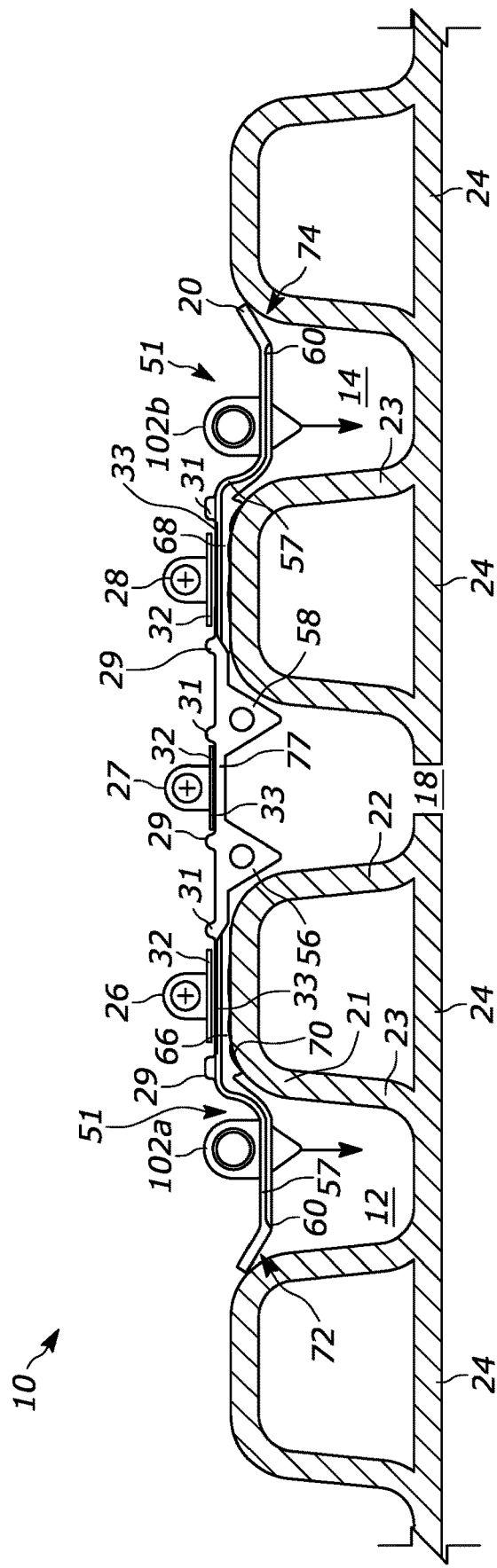
FIG. 2B is a partial sectional-side view of the pipe coupling assembly of FIG. 1B along section lines 2B-2B.

Referring again to FIGS. 1A-1B, the pipe coupling assembly 10 provides a fluid-tight connection between the first 12 and second 14 pipe sections over a void 18 therebetween (see FIGS. 2A-2B). The void 18 represents the space between the pipe sections that can range from several inches to a hairline break or fractures in either one of the first and second pipe sections 12 or 14. The pipe coupling assembly 10 advantageously adapts first and second pipe sections 12, 14 together without having special geometrical constructions at the pipe section ends, such as bell and spigot configurations typically required in conventional piping connections. Accordingly, the pipe coupling assembly 10 reduces the expense and cost associated with forming special end configurations required or special sealing gaskets for connecting conventional corrugated piping sections. The pipe coupling assembly 10 further comprises locking mechanisms 102 and corresponding cords 104, wherein the cords advantageously tighten to using the locking mechanism to securely couple the first and second pipe sections 12, 14 together. Further, the pipe coupling assembly 10 advantageously provides the flexibility of attaching two sections of piping or sealing a leak or leaks in an existing pipe at any location along the pipe. Yet another advantage provided by the coupling assembly 10 is its ability to connect any length of pipe, eliminating the need for standard pipe lengths having specialized end connections, such as bells and spigots.

The pipe coupling assembly 10 includes an annular body 20 formed of a unitary, tubular configuration that is circumferentially positioned around transverse corrugations 22 of the first and second pipe sections 12, 14. Alternatively, for repairing a leak, the annular body 20 is circumferentially positioned around transverse corrugations of a single pipe section 12 or 14, or two pipe sections formed from a single pipe section. The unitary tubular configuration can be formed by welding opposite ends of the annular body 20 together. The welding of the ends of a coupling can be achieved in a similar fashion as described in U.S. Pat. No. 7,503,992 entitled FLASHLESS WELDING METHOD AND APPARATUS that issued on Mar. 17, 2009 and assigned to the assignee of the present application. The 7,503,992 patent is incorporated herein by reference in its entirety for all purposes. The corrugated pipe sections 12, 14, include a plurality of crests 21 and valleys 23 and an inner pipe or liner 24 that can be independent or fused to the transverse corrugations 22, as seen, for example, by the partial-sectional-side view of FIGS. 2A-2B.

As shown in the illustrated example embodiments of FIGS. 2A-2B, the pipe coupling assembly 10 further comprises body clamping structures 26, 27, and 28 positioned between first and second locating bosses 29, 31. It would be appreciated by one having ordinary skill in the art that all, some, or none of the body clamping structures 26, 27, 28, can be present in the pipe coupling assembly 10. A slip coat 33 is formed by extrusion between the first and second locating bosses 29, 31. In one embodiment, the body clamping structures 26, 27, and 28 comprise an attachment assembly 30, as illustrated in FIG. 5.

Figure 5:
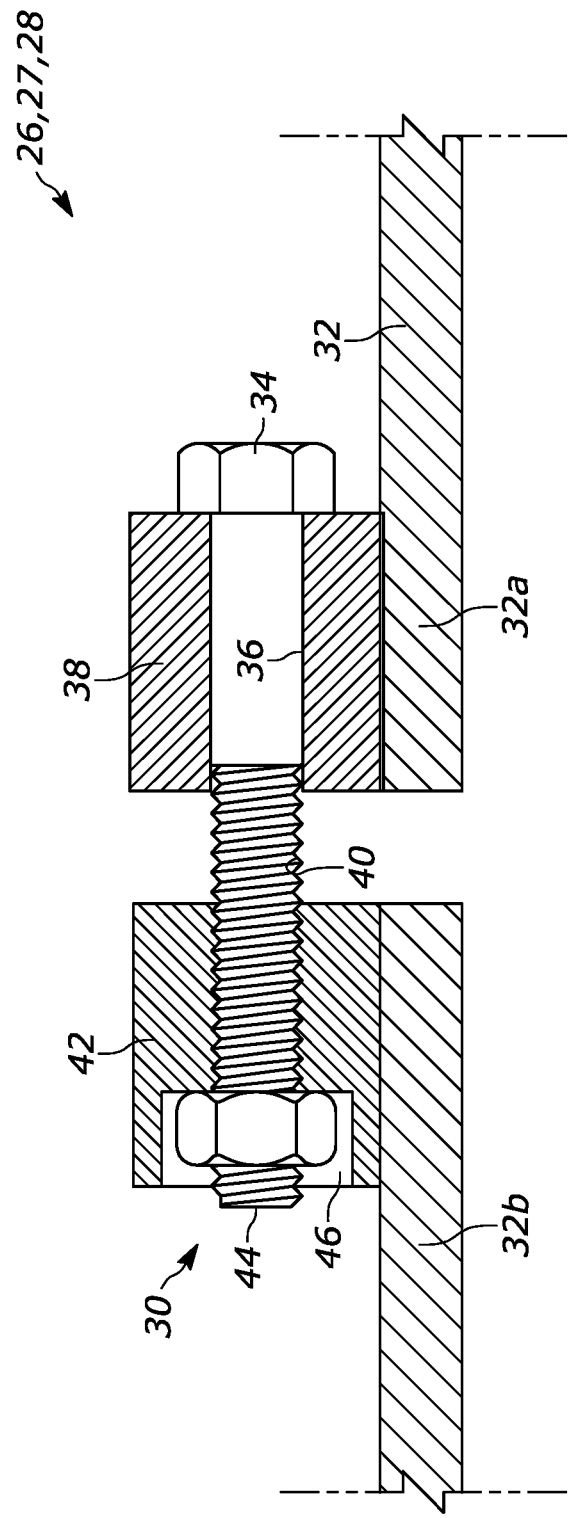
FIG. 5 is a partial sectional-side view of a body clamping structure having an attachment assembly for use with a pipe coupling assembly constructed in accordance with one embodiment of the present disclosure, facilitating the forming of a fluid-tight sealing connection between two pipe sections.

As illustrated in FIGS. 2A-2B, and 5, the attachment assembly 30 includes a circular strap 32 for securing the annular body 20 over the respective pipe sections 12, 14 during installation by locking together first and second ends 32a and 32b, respectively. The attachment assembly 30 further comprises a fastener 34 that passes through a clearance-hole 36 of a first fixture 38 secured to the first end 32a of the circular strap 32. The fastener 34 passes through a second clearance-hole 40 in a second fixture 42 secured to the second end 32b of the circular strap 32. The fastener 34 includes a threaded end 44 for adjustably securing the strap 32 in combination with a nut 46. Alternatively, as illustrated in the example embodiment of FIG. 5, the second clearance hole 40 is tapped or threaded, avoiding the need for the nut 46, as the fastener 34 engages at its threaded end 44 with the second fixture 42.

While the attachment assembly 30 illustrates one embodiment for securing the strap 32 over the annular body 20, other types of clamps, such as tie wraps, hose clamps, lever or toggle clamps, and the like, could also be used without departing from the spirit and scope of the claimed invention. Further, the attachment assembly 30 in the exemplary embodiment of FIGS. 2A-2B is composed of nylon, but could also be made from steel, fiberglass, plastic, or any combination thereof.

The annular body 20 in the exemplary embodiment of FIGS. 2A-2B comprises a plurality of elastomeric materials unitarily formed by extruding or molding operations. The unitary annular body 20 comprises medial sections 56, 58 and end portions 60, 62 having a durometer ranging between 40-50 on a Shore D scale.

It is noted that any material having such relative hardness and flexibility capable of handling the water pressure to prevent stretching or ballooning of the medial sections 56, 58 and end portions 60, 62 can be used, and examples of suitable materials include High Density Polyethylene ("HDPE") plastic and rigid polypropylene plastic.

Figure 4:
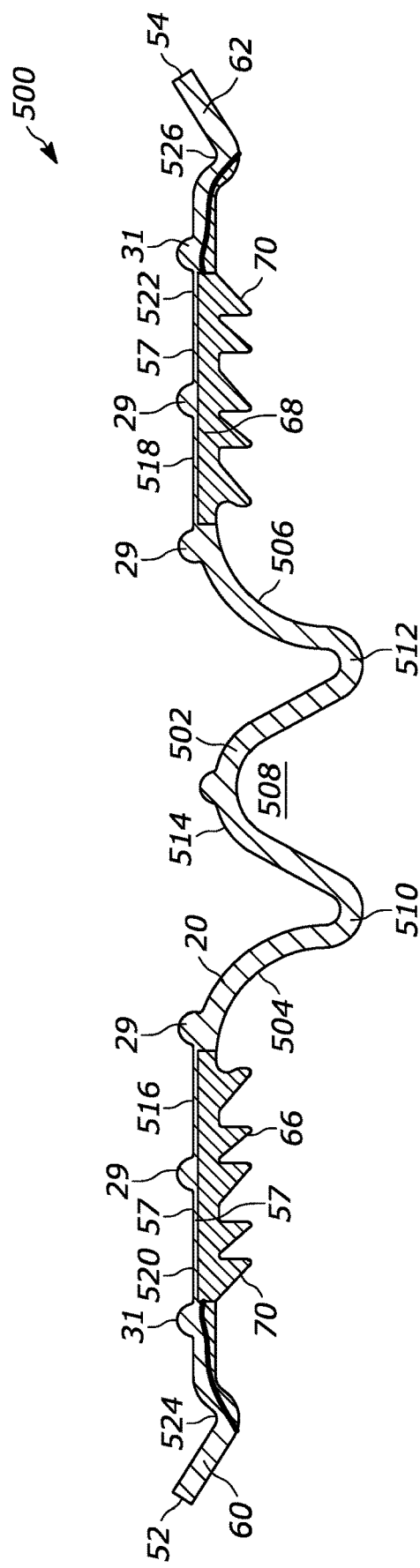
FIG. 4 is a partial sectional-side view of a pipe coupling assembly constructed in accordance with another embodiment of the present disclosure.

The annular body 20 further comprises first and second annular sealing members 66 and 68, respectively. The annular sealing members 66, 68 are made from a relatively lower durometer (ranging between approximately 40 to 60 on a Shore A scale) to form a pliable fluid-tight seal with the respective first or second pipe sections 12 and 14 or over a leak in a single pipe section. Facilitating the pliable fluid-tight seal are lobes 70 projecting from at least a portion of the sealing members 66, 68 toward the void 18, and/or in a direction transverse to the annular body, the sealing members producing a pressure enhancing seal (e.g., as illustrated in FIG. 4). The lobes 70 are in contact with the crest 21 of respective pipe section 12, 14 and further deform upon the tightening of the circular straps 32 and/or the locking mechanisms 102a, 102b and cords 104a, 104b.

The locking mechanisms 102a, 102b and cords 104a, 104b provide circumferential force to the pipe coupling assembly 10. In one example embodiment, the reinforcing section 57 and the annular sealing members 66, 68 extend to or near to the end portions 60, 62. As illustrated in FIGS. 2A-2B, the lower durometer of the sealing members and the relatively low thickness of the reinforcing section 57 allows the locking mechanisms 102a, 102b in conjunction with cords 104a, 104b, respectively, to create a trough 51 (see e.g., FIG. 2B) the closely conforms to the shape of the first and second piping sections 12, 14. In one example embodiment, the body clamping structures 26, 27, 38 are omitted.

Reinforcing sections 57 ranging between 0.002" to 0.005" of an inch in thickness and extend from the medial sections 56, 58 of the 40-50 Shore D material to the end portions 60, 62 and between at least one of the straps 32 and sealing members 66, 68. The reinforcing sections 57 provide support to the annular member 20 and prevent penetration, ballooning, or tearing in the sealing members 66, 68 by the straps 32. However, it in some applications, the reinforcing sections 57 are removed to allow lower insertion force of the coupling assembly 10 over the corrugated pipe 20. By omitting the reinforcing sections 57, the sealing members 66, 68, because of their relatively softer material are allowed to stretch over the crests 21 portions of the corrugation. This allows more forgiveness in variations experienced in the manufacturing tolerances of the corrugation piping or flexibility that may be required in applications for the coupling assembly 10.

An example of a suitable material for the sealing members 66, 68 includes ASTM F477 Low Head material (ASTM F477 LH), which has a durometer of 50 plus or minus five on a Shore A scale. One company that makes ASTM F477

LH material is Advanced Elastomer Systems L.P. located in Akron, Ohio under their brand name SANTOPRENE®. Advanced Elastomer Systems' part number for SANTOPRENE® is 101-55. Dow Corning also produces ASTM F477 LH material under the part number 5904LC. Although elastomeric materials have been discussed, various polymers, thermoplastics, or rubbers having a durometer within the above-identified ranges could also be used as suitable materials without departing from the spirit and scope of the claimed invention.

Located on the underside of the end portions 60, 62 of the annular body 20 are lubrication segments 72, 74 that are in contact with respective pipe section 12, 14. The lubricated segments 72, 74 are attached to the annular body 20 by molding, extruding, bonding, painting, spraying, impregnating, or any other known form of attachment of lubrication to an elastomeric, thermoplastic, polymeric, or rubber material. Further, the lubrication segments 72, 74 are formed from any known lubricants, including, but not limited to, polyethylene, polypropylene, polytetrafluoroethylene (TEFLON®), graphite powder/molybdenum disulfide, and silicone.

In one exemplary embodiment, the lubrication segments 72, 74 are molded or extruded into the annular body 20 from a permanently lubricated film having a low coefficient-of-friction "COF" and more specifically, a COF level of point five (0.5) or less. An example of such suitable material for the lubricated film includes polyethylene or polypropylene, which has an approximate COF of point three (0.3). The lubricated segments 72, 74 are relatively thin, having a thickness range between 0.001" to 0.010" inches, preferably ranging between 0.003" to 0.005" inches. The lubricated segments 72, 74 may further include protrusions or ribs to further enhance the sealing connection formed therein.

During the manufacturing of the piping sections in for example, a plant or manufacturing facility, an operator can attach two pipe sections 12, 14 without the need for any special end configurations such as a spigot or bell typically required in conventional corrugated piping. Instead, the operator can use the coupling assembly 10 for attaching the ends of any two-pipe sections.

In the illustrated example embodiment of FIGS. 1A-2B, the annular body 20 is pushed onto the first pipe section 12, traversing the crest 21 of the transverse corrugation section 22 with the aid of lubrication segments 72, 74 until the locking mechanism 102a, and cord 104a overlay the valley 23. Responsive to tightening the cord 104a, the lobes 70 of the annular sealing member 66 are forced toward the void 18 in a pressure enhancing orientation. Once the coupling assembly 10 covering the first pipe section 12 is in place, the second pipe section 14 is inserted into the annular body 20 until the locking mechanism 102b, and cord 104b overlay the valley 23.

Responsive to tightening the cord 104b, the lobes 70 of the annular sealing member 68 are forced toward the void 18 in a pressure enhancing orientation. Body clamping structures 26, and 28 are then positioned over respective sealing members 66, 68, and/or body clamping structure 27 is positioned over a mid-section 77 and tightened until achieving a secure fluid-tight seal. The cords 104a, 104b are similarly positioned and tightened creating respective troughs 51 (see FIG. 2B) to hold the annular body 20 in position and further facilitate in forming the fluid-tight seal of the pipe coupling assembly 10.

Figure 3A:
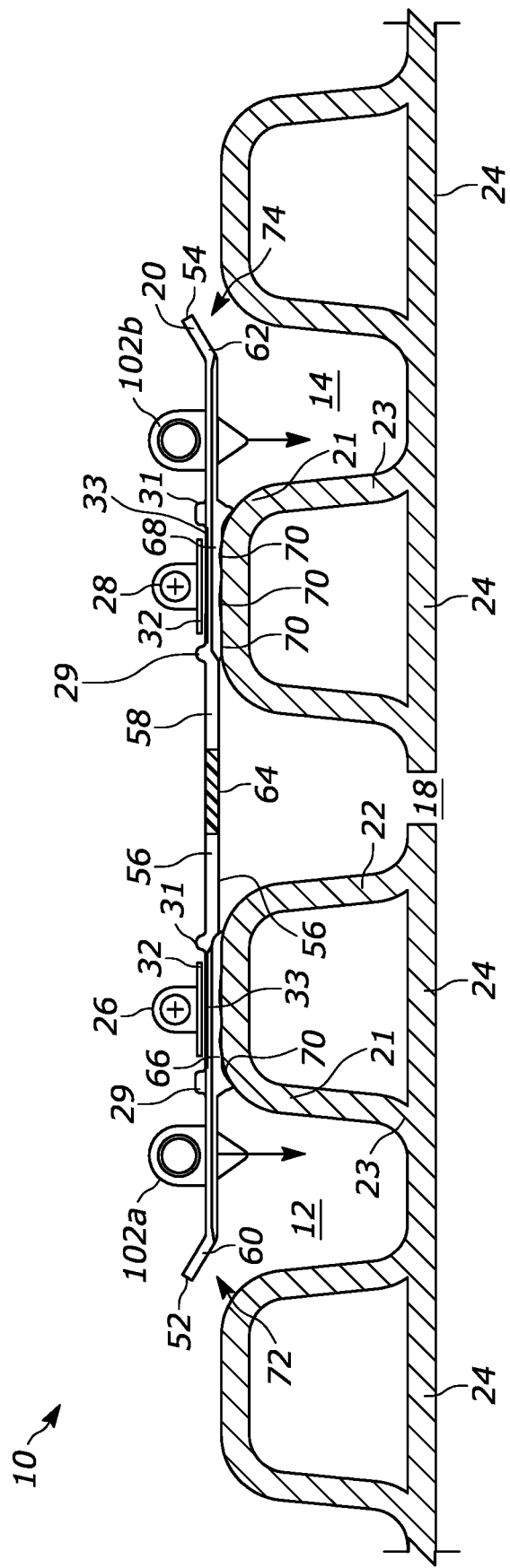
FIG. 3A is a partial sectional-side view of another example embodiment of a pipe coupling assembly constructed in accordance with the present disclosure forming a fluid-tight sealing connection between two corrugated pipe sections.

FIG. 3A illustrates a partial sectional-side view of another example embodiment of a pipe coupling assembly 10 constructed in accordance with the present disclosure, the pipe coupling assembly 10 of FIG. 3A is substantially the same as the pipe coupling assembly 10 of FIGS. 2A-2B except as specifically disclosed herein. The pipe coupling assembly 10 illustrated in FIG. 3A, for forming a fluid-tight sealing connection between two pipe sections, or over a leak in a single pipe section. In the illustrated example embodiment of FIG. 3A, a semi-flexible material, having a durometer ranging between 50 and 80 on a Shore A scale forms a flexing section 64. A suitable material for forming the flexing section 64 includes, but is not limited to, Santoprene® TPV 101-64 manufactured by Advanced Elastomer Systems L.P. located in Akron, Ohio. The medial sections 56, 58, and end portions 60, 62 help hold the shape of the annular body 20 over the piping sections 12, 14 with relatively little deformation. In contrast, flexing section 64 allows for deformation and permits hinge-like motion in the annular body in order to accommodate misalignment between the first and second pipe sections 12, 14 and/or cracks/breaks in a single pipe section and ease of assembly, including installing the coupling assembly 10 during repairs in the field or over a leak in a single pipe section.

In the field, upon discovering a leak, a contractor can cut along the leak of any piece of corrugated pipe at any location to form first and second pipe sections 12, 14 of FIGS. 1A-1B by using a saw, portable router, or knife. The pipe coupling assembly 10 is assembled over the pipe sections 12, 14 in a similar fashion as the method described above for assembly in a manufacturing facility or plant. However, in the field, the advantages of the flexible section 64 becomes more pronounced in assisting aligning the pipe sections where precise alignment is difficult, because of the piping being partially buried in the ground.

The construct of the pipe coupling assembly 10 in addition to the strength and sealing advantages described also provides advantageously a design with reduced cost for manufacturing. That is, the more pliable and costly material found, for example in the sealing members 66 and 68 are molded or co-extruded only in the areas needed, as shown in the illustrated embodiments.

The overall length of the pipe coupling assembly 10 is not limited to any particular size and could span several inches or even feet to adjoin separated pipe sections. In one embodiment, the pipe coupling assembly 10 has a diameter ranging from one (1") inch to sixty (60") inches that attach corresponding diameters in first and second pipe sections, 12 and 14, respectively. In the pipe coupling assembly 10 having a smaller scale of twelve (12") inches in diameter or less, for example, is suitable for residential and commercial applications. Further, in one embodiment, the annular body 20 covers several transverse sections 22 on each side before encountering the void 18 or leak in the piping section.

Figure 3B:
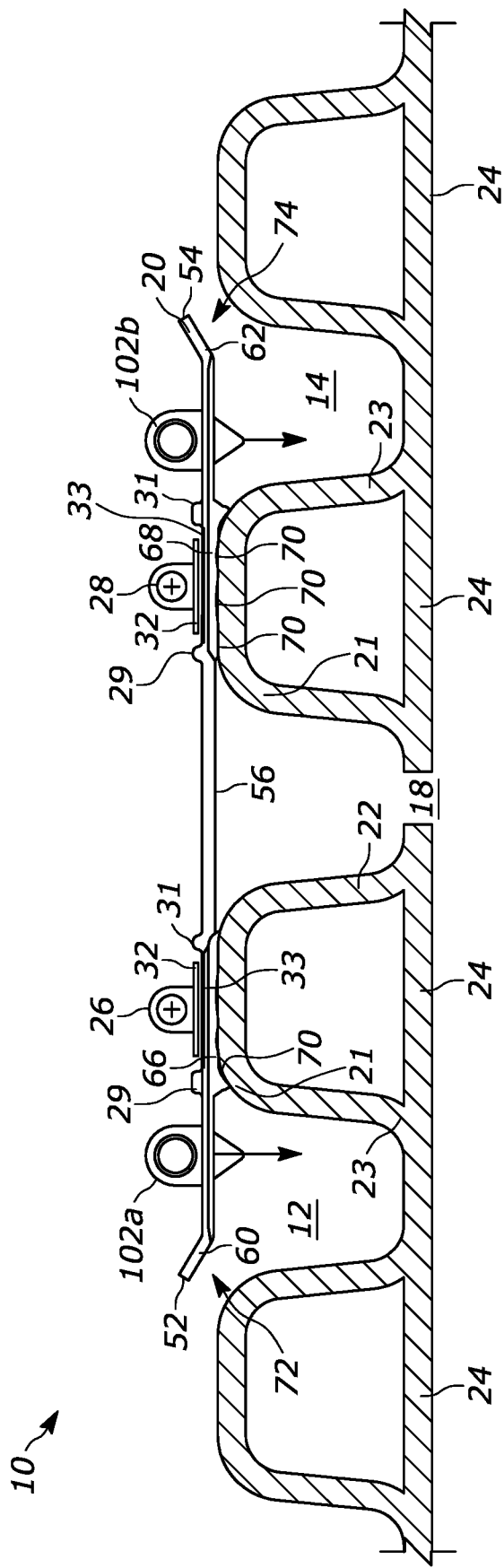
FIG. 3B is a partial sectional-side view of yet another example embodiment of a pipe coupling assembly constructed in accordance with the present disclosure forming a fluid-tight sealing connection between two corrugated pipe sections.

FIG. 3B illustrates a partial sectional-side view of another example embodiment of a pipe coupling assembly 10 constructed in accordance with the present disclosure forming a fluid-tight sealing connection between two pipe sections, or over a leak in a single pipe section. The annular body 20 in the exemplary embodiment of FIG. 3B comprises a plurality of elastomeric materials unitarily formed by extruding or molding operations. The pipe coupling assembly 10 of FIG. 3B is substantially the same as the pipe coupling assembly 10 of FIG. 3A, except where specifically disclosed herein. The unitary annular body 20 comprises a medial section 56 and end portions 60, 62 having a durometer ranging between 40-50 on a Shore D scale. It is noted that any material having such relative hardness and flexibility capable of handling the water pressure to prevent stretching or ballooning of the medial section 56 and end portions 60, 62 can be used, and examples of suitable materials include High Density Polyethylene ("HDPE") and rigid polypropylene plastic. The medial section 56 and end portions 60, 62 help hold the shape of the annular body 20 over the piping sections 12, 14.

Once the coupling assembly 10 of FIG. 3B covering the first pipe section 12 is in place, the second pipe section 14 is inserted into the annular body 20 wherein, tightening of the cord 104b with the locking mechanism 102b creates a trough 51, forcing the lobes 70 of the annular sealing member 68 toward the void 18 in a pressure enhancing orientation against respective crest 21. Body clamping structures 26, and 28 are then positioned over respective sealing members 66, 68 and tightened until achieving a secure fluid-tight seal. In another example embodiment, the cords 104a, 104b are tightened using the locking mechanisms 102a, 102b, after the clamping structures 26, 28 are positioned. In yet another example embodiment, the cords 104a, 104b are tightened using the locking mechanisms 102a, 102b, and the clamping structures 26, 28 are absent.

Figure 3C:
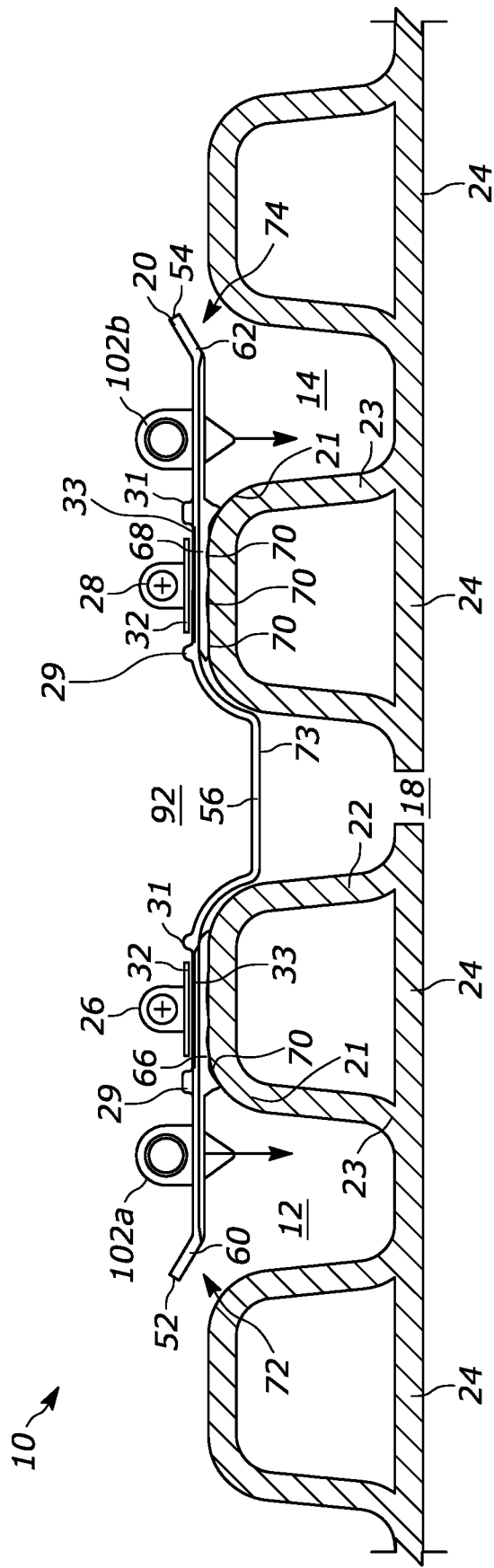
FIG. 3C is a partial sectional-side view of a pipe coupling assembly constructed in accordance with yet another embodiment of the present disclosure forming a fluid-tight sealing connection between two corrugated pipe sections.

FIG. 3C illustrates a partial sectional-side view of another example embodiment of a pipe coupling assembly 10 constructed in accordance with the present disclosure forming a fluid-tight sealing connection between two pipe sections or over a leak of a single pipe section. The pipe coupling assembly 10 of FIG. 3C is substantially the same as the pipe coupling assembly 10 of FIG. 3A, except where specifically disclosed herein. The unitary annular body 20 of FIG. 3C comprises a medial section 56 that also acts as a stop 73 to facilitate the positioning of the coupling assembly 10 over the crests 21 of the corrugations 22 during installation. In particular, the stop 73 is constructed to form a channel along the annular member 20 such that the coupling assembly 10 pops into location acting as an indicator to the user that the coupling is properly seated.

Located laterally to the medial section 56 and stop 73 are and end portions 60, 62. The medial portion 56, stop 73 and end portions 60, 62 in the illustrated embodiment have a durometer ranging between 40-50 on a Shore D scale. It is noted that any material having such relative hardness and flexibility capable of handling the water pressure to prevent stretching or ballooning of the medial section 56, and end portions 60, 62 be used, and examples of suitable materials include High Density Polyethylene ("HDPE") and rigid polypropylene plastic. The medial section 56, stop 73 and end portions 60, 62 help hold the shape of the annular body 20 over the first and second piping sections 12, 14 with relatively little deformation, or in the illustrated embodiment of FIG. 3C between a void in the first pipe section 12. However, in the field, the advantages of a channel 92 above the medial section 56 allow for hinge-like motion of the coupling assembly 10 during installation. The hinge-like motion becomes more pronounced in assisting aligning the pipe sections where precise alignment is difficult, because of the piping being partially buried in the ground.

In the illustrated example embodiment of FIG. 3C, the annular body 20 is pushed onto the first pipe section 12, traversing the crest 21 of the transverse corrugation section 22 with the aid of lubrication segments 72, 74 until the locking mechanism 102a, and cord 104a overlay the valley 23 and/or the stop 73 is engaged by the transverse corrugation section 22. Responsive to tightening the cord 104a, the lobes 70 of the annular sealing member 66 are forced toward the void 18 in a pressure enhancing orientation. Once the coupling assembly 10 covering the first pipe section 12 is in place, the second pipe section 14 is inserted into the annular body 20 until the locking mechanism 102b, and cord 104b overlay the valley 23 and/or the stop 73 is engaged by the transverse corrugation section 22 with the aid of lubrication segments 72, 74. Responsive to tightening the cord 104b, the lobes 70 of the annular sealing member 68 are forced toward the void 18 in a pressure enhancing orientation. Body clamping structures 26, and 28 are then positioned over respective sealing members 66, 68 forcing the lobes 70 of the annular sealing member 68 toward the void 18 in a pressure enhancing orientation against respective crest 21. Body clamping structures 26 and 28 are then positioned over respective sealing members 66, 68 and tightened until achieving a secure fluid-tight seal. The cords 104a, 104b are similarly positioned and tightened creating respective troughs 51 to hold the annular body 20 in position and further facilitate in forming the fluid-tight seal of the pipe coupling assembly 10.

Figure 3D:
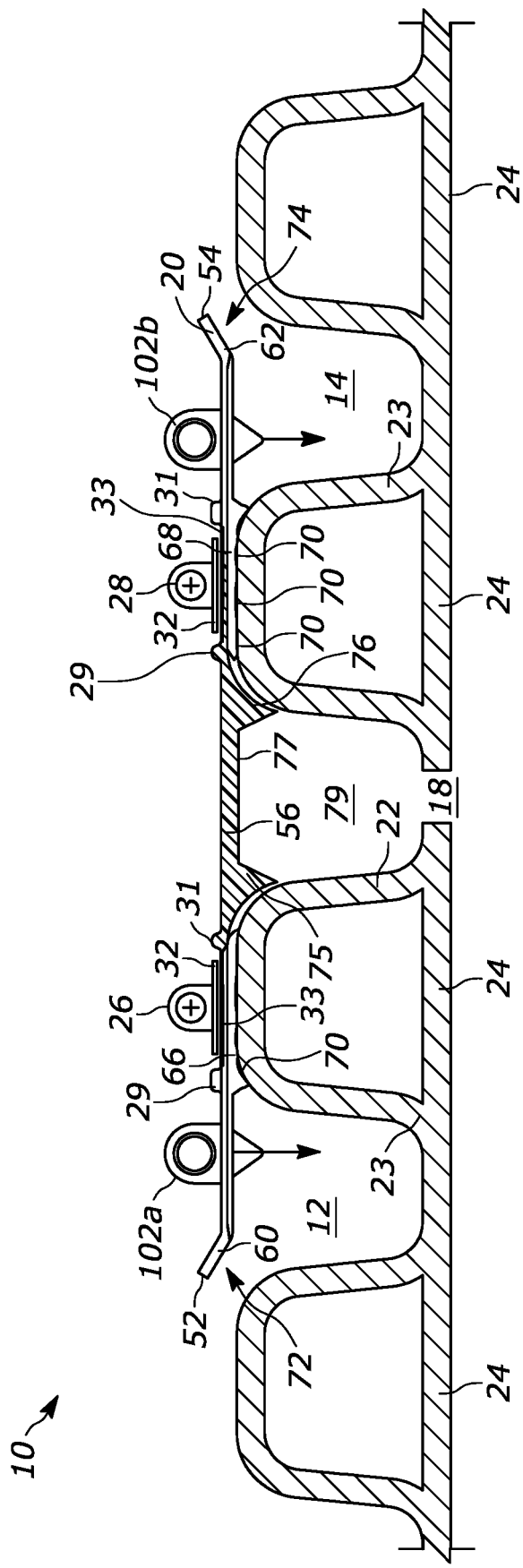
FIG. 3D is a partial sectional-side view of a pipe coupling assembly constructed in accordance with yet another embodiment of the present disclosure being positioned for forming a fluid-tight sealing connection between two corrugated pipe sections.

FIG. 3D illustrates a partial sectional-side view of another example embodiment of a pipe coupling assembly 10 constructed in accordance with the present disclosure forming a fluid-tight sealing connection between two pipe sections or over a leak of a single pipe section. The pipe coupling assembly 10 of FIG. 3D is substantially the same as the pipe coupling assembly 10 of FIG. 3A, except where specifically disclosed herein. The annular body 20 in the exemplary embodiment of FIG. 3D comprises a plurality of elastomeric materials unitarily formed by extruding or molding operations. The unitary annular body 20 comprises a medial section 56 that also includes arcuate stops 75, 76 along the inner portion of the annular body that facilitate the positioning of the coupling assembly 10 over the crests 21 of the corrugations 22 during installation. In particular, the stops 75, 76 are constructed to form a channel 77 along an inner portion 79 of the annular member 20 such that the coupling assembly 10 pops into location acting as an indicator to the user that the coupling is properly seated. The addition of the stops 75, 76 prevent the coupling assembly 10 from over traveling during installation by contacting the crest 21 of the corrugation once a sufficient amount of insertion is achieved. The annular body 20 along the medial portion 57 is further reduced in cross-sectional area, formed by the channel 77 that allows added flexibility between first 52 and second 54 ends of the annular body during assembly onto the pipe or pipes, 12, 14.

Located laterally to the medial section 56 and stops 75, 76 are and end portions 60, 62. The medial portion 56, stops 75, 76 and end portions 60, 62 in the illustrated embodiment have a durometer ranging between 40-50 on a Shore D scale. It is noted that any material having such relative hardness and flexibility capable of handling the water pressure to prevent stretching or ballooning of the medial section 56 and end portions 60, 62 can be used, and examples of suitable materials include High Density Polyethylene ("HDPE") and rigid polypropylene plastic. The medial section 56, stops 75, 76, and end portions 60, 62 help hold the shape of the annular body 20 over the piping sections 12, 14 with relatively little deformation. In contrast, the channel 77 allows for deformation and permits hinge-like motion in the annular body in order to accommodate misalignment between the pipe sections 12, 14 and ease of assembly, including, installing the coupling assembly 10 during repairs in the field or over a leak in a single pipe section.

Located on the underside of the end portions 60, 62 and along inner walls of the stops 75, 76 of the annular body 20 are lubrication segments 72, 74 that are in contact with respective sections of pipes 12, 14.

In the illustrated example embodiment of FIG. 3D, the annular body 20 is pushed onto the first pipe section 12, traversing the crest 21 until the stop 75 is engaged by the transverse corrugation section 22 with the aid of lubrication segments 72, 74 until the locking mechanism 102a, and cord 104a overlay the valley 23 and/or until the stop 75 is engaged by the transverse corrugation section 22. Responsive to tightening the cord 104a, the lobes 70 of the annular sealing member 66 are forced toward the void 18 in a pressure enhancing orientation. Once the coupling assembly 10 covering the first pipe section 12 is in place, the second pipe section 14 is inserted into the annular body 20 until the stop 77 is engaged by the transverse corrugation section 22 and/or the locking mechanism 102b, and cord 104b overlay the valley 23. Responsive to tightening the cord 104b, the lobes 70 of the annular sealing member 68 are forced toward the void 18 in a pressure enhancing orientation. Body clamping structures 26, and 28 are then positioned over respective sealing members 66, 68, and/or body clamping structure (not shown) is positioned over a mid-section (not shown) and tightened until achieving a secure fluid-tight seal. The cords 104a, 104b are similarly positioned and tightened creating respective troughs 51 to hold the annular body 20 in position and further facilitate in forming the fluid-tight seal of the pipe coupling assembly 10. It would be appreciated by one having ordinary skill in the art that the mid-section 77 and the body clamping structure 27 can be absent or present on the annular body 20 in at least FIGS. 3A, 3B, and 3D.

Figure 3E:
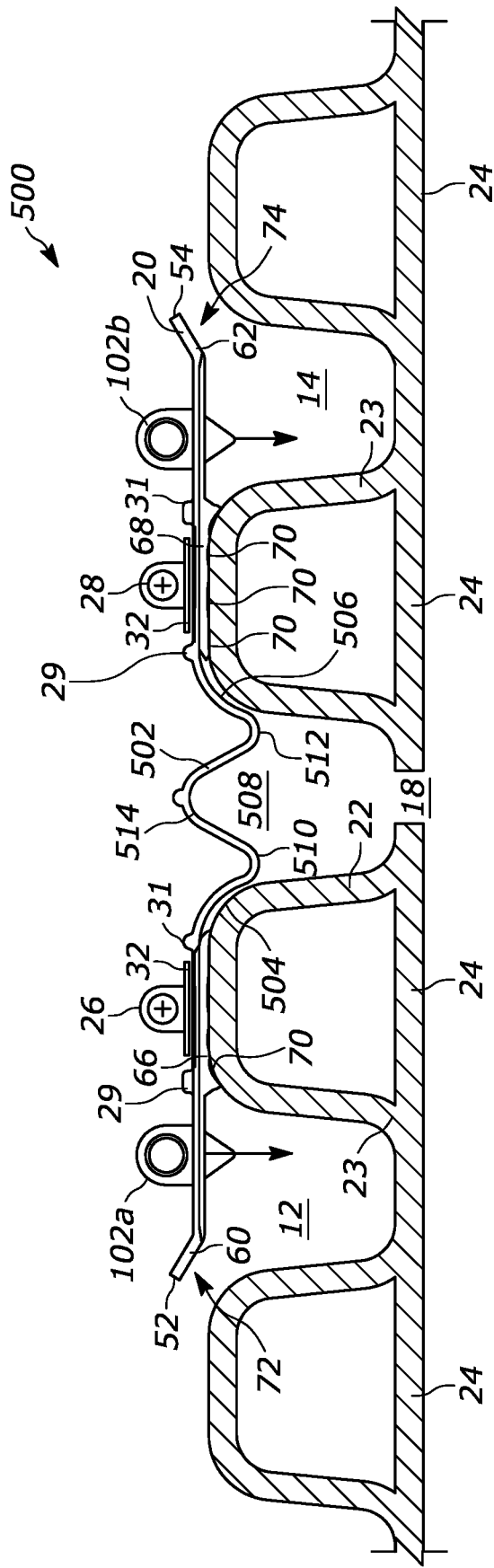
FIG. 3E is a partial sectional-side view of a pipe coupling assembly constructed in accordance with the embodiment of FIG. 4 forming a fluid-tight sealing connection between two corrugated pipe sections or over an opening in a pipe.

FIG. 4 illustrates a partial sectional-side view of an example embodiment of an annular pipe coupling assembly 10, the pipe coupling assembly provides a fluid-tight connection between first 12 and second 14 pipe sections over the void 18 therebetween, as illustrated in FIG. 3E. The pipe coupling assembly 10 of FIGS. 3E and 4 are substantially the same as the pipe coupling assembly 10 of FIG. 3A, except where specifically disclosed herein.

The annular body 20 in the exemplary embodiment of FIGS. 3E and 4 comprises a plurality of elastomeric materials unitarily formed by extruding or molding operations. The unitary annular body 20 comprises an undulating medial section 502 that also includes arcuate stops 504 and 506 along the inner portion of the annular body that facilitate the positioning of the coupling assembly 10 against or near the crests 21 of the corrugations 22 during installation (see FIG. 3E). In particular, the stops 504, 506 are constructed to form an inner region 508 comprising inner lobes 510 and 512 of the undulating medial section 502. The stops 504, 506 may contact the corrugation 22 during assembly as an indicator to the user that the coupling is properly seated. The addition of the stops 504, 506 prevent the coupling assembly 10 from over traveling during installation by contacting a portion of the crest 21 of the corrugation 22 once a sufficient amount of insertion is achieved.

However, it should be noted and as shown in FIG. 3E, a fluid tight seal is still achieved even if the stops 504, 506 do not contact the corrugation 22. The undulating medial section 502 further comprises a riser 514 that provides strength to the overall annular pipe coupling assembly 10 when welded in forming its annular shape. In particular, the riser 514 in combination with the inner lobes 510 and 512 prevent kinking or stresses in the coupling when assembled. The geometrical profile of the undulating medial section 502 also provides strength to the overall coupling assembly while allowing added flexibility between first 52 and second 54 ends of the annular body during assembly onto the pipe or pipes, 12, 14.

Located laterally to the undulating medial section 502 and stops 504, 506 are and end portions 60, 62. The undulating medial section 502, stops 504, 506 and end portions 60, 62 in the illustrated embodiment have a durometer ranging between 35-50 on a Shore D scale and preferably a Shore D value of approximately 40. The material thickness in the sectional view shown in FIG. 4 for the undulating medial section 502, stops 504, 506, and end portions 60, 62 range between approximately 1/16" and 1/4" inches and are preferably 1/8" inches thick for smaller diameter applications, for example 12" inches or less and preferably 3/16" inch thick for larger diameter applications.

It is noted that any material having such relative hardness and flexibility capable of handling the water pressure to prevent stretching or ballooning of the undulating medial section 502 and end portions 60, 62 can be used, and examples of suitable materials include High Density Polyethylene ("HDPE") and rigid polypropylene plastic. The undulating medial section 502, stops 504, 506, and end portions 60, 62 help hold the shape of the annular body 20 over the piping sections 12, 14 with relatively little radial deformation. In contrast, the undulating medial section 502 allows for lateral deformation and permits hinge-like motion in the annular body in order to accommodate misalignment between the pipe sections 12, 14 and ease of assembly, including, installing the coupling assembly 500 during repairs in the field or over a leak in a single pipe section.

The pipe coupling assembly 10 further comprises body clamping structures 26 and 28 positioned within securing stations 516 and 518 between first and second locating bosses 29, 31. In one embodiment, the body clamping structures 26 and 28 comprise the attachment assembly 30, as illustrated in FIG. 5.

In addition to the security provided by the clamping structures 26 and 28 to the annular body 20, additional securing stations 520 and 522 are provided for high pressure applications. The plurality of securing stations 516-522 that surround the coupler 10 of FIGS. 3E and 4, also provide flexibility in locating the clamping structures based on variations in the corrugations 22 size. Additional security is available the locking mechanisms 102a, 102b and the cords 104a, 104b that are provided for securing first 52 and second 54 ends of the annular body 20 over the crest 21 of the transverse corrugations 22 into the valleys 23 by placing the cords 104a, 104b in troughs 524, 526.

Reinforcing sections 57 ranging between 0.002" to 0.005" of an inch in thickness are formed with the 35-50 Shore D material and extend from the medial section 502 and the end portions 60, 62 and form the securing sections 516-522 covering the sealing members 66, 68. The reinforcing sections 57 provide support to the annular member 20 and prevent penetration, ballooning, or tearing in the sealing members 66, 68 by the straps 32. The reinforcing sections 57 also provide enough rigidity to allow clamping structures to be used without tearing the softer material used in the sealing members 66 and 68.

In the illustrated example embodiment of FIG. 3E, the annular body 20 is pushed onto the first pipe section 12 that traverses the crest 21 until the stop 504 is engaged by or in close proximity with the transverse corrugation section 22, and/or until the locking mechanism 102a, and cord 104a overlay the valley 23, forcing the lobes 70 of the annular sealing member 66 toward the void 18 in a pressure enhancing orientation. Once the first section of pipe 12 is in place, the second section of pipe 14 is inserted into the annular body 20 until the stop 506 is engaged by or in close proximity with the transverse corrugation section 22, and/or until the locking mechanism 102b, and cord 104b overlay the valley 23, forcing the lobes 70 of the annular sealing member 68 toward the void 18 in a pressure enhancing orientation against respective crests 21. Body clamping structures 26 and 28 are then positioned over respective sealing members 66, 68 in first sets of securing structures 516-518 or 520-522 or both, depending on the size of the corrugation and/or pressure requirements. The cords 104a, 104b are positioned and tightened further defining respective troughs 51 to hold the annular body 20 in position and further facilitate in forming the fluid-tight seal of the pipe coupling assembly 10.

Locking Mechanism 102

As shown in the illustrated embodiment of FIGS. 6-19, the locking mechanism 102 comprises a body 132 and first and second locking caps 108, 110. The body 132 is formed from a polymer such as nylon, and/or from metal, and/or the like. The body 132 is formed by at least one of injection molding, molding, extrusion, etc. The locking caps 108, 110 comprise nylon, metal, and/or the like, and are formed by molding, machining, forging, 3D printing, and/or the like. The body 132 comprises a substantially cylindrical shape and extends along a common axis CA. (See FIG. 7).

As shown in the illustrated embodiments of FIGS. 13-16, the body 132 defines a first substantially hollow tube 103 and a second substantially hollow tube 105. The first substantially hollow tube 103 connects a first body end 128 and a first arcuate opening 124. The second substantially hollow tube 105 connecting a second body end 130 and a second arcuate opening 126.

Figure 7:
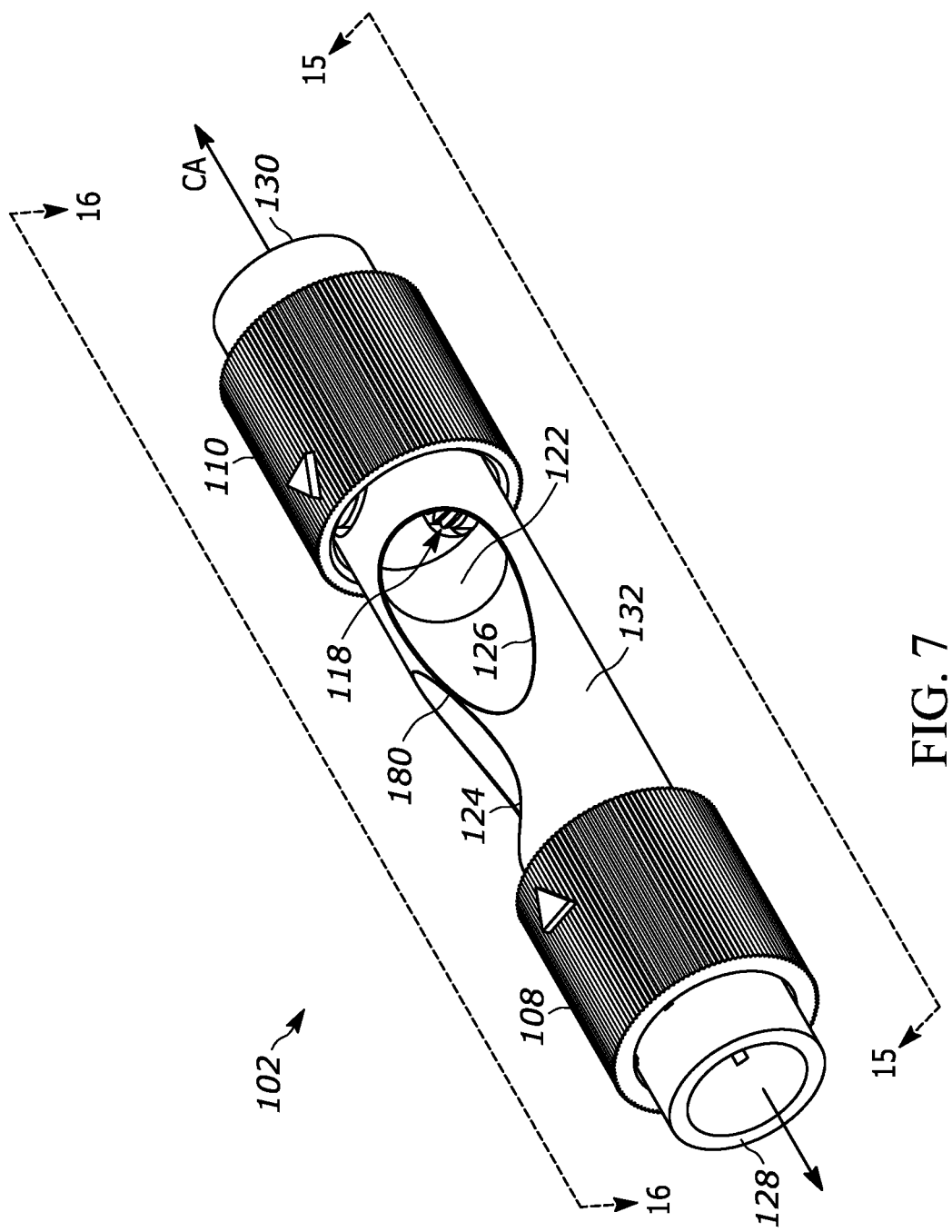
FIG. 7 is a top perspective view of a locking mechanism in accordance with one example embodiment of the disclosure.
Figure 8:
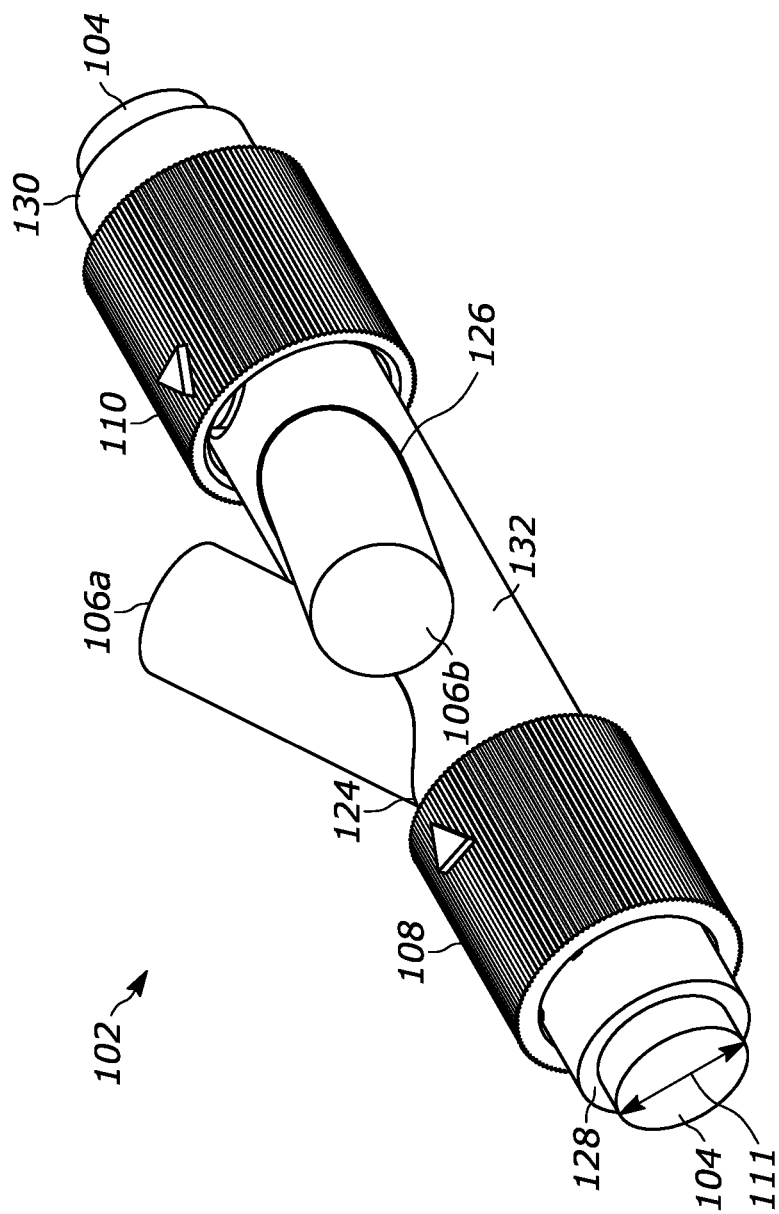
FIG. 8 is a top perspective view of FIG. 7, wherein a portion of a cord is present in the locking mechanism in accordance with another embodiment of the present disclosure.

As illustrated in the example embodiment of FIG. 8, during use, a first cord end 106a of the cord 104 is inserted into the first body end 128 through the substantially hollow tube 103 and out of the first arcuate opening 124, and a second cord end 106b of the cord 104 is inserted into the second body end 130 through the substantially hollow tube 105 and out of the second arcuate opening 126. The first and second arcuate openings 124, 126 are separated by a separation portion 180 (see FIG. 7) of the body 132. The body 132 is between about 50 mm to about 100 mm long along the common axis CA, and has a body outer diameter 128b between about 13 mm to about 25 mm.

Figure 6:
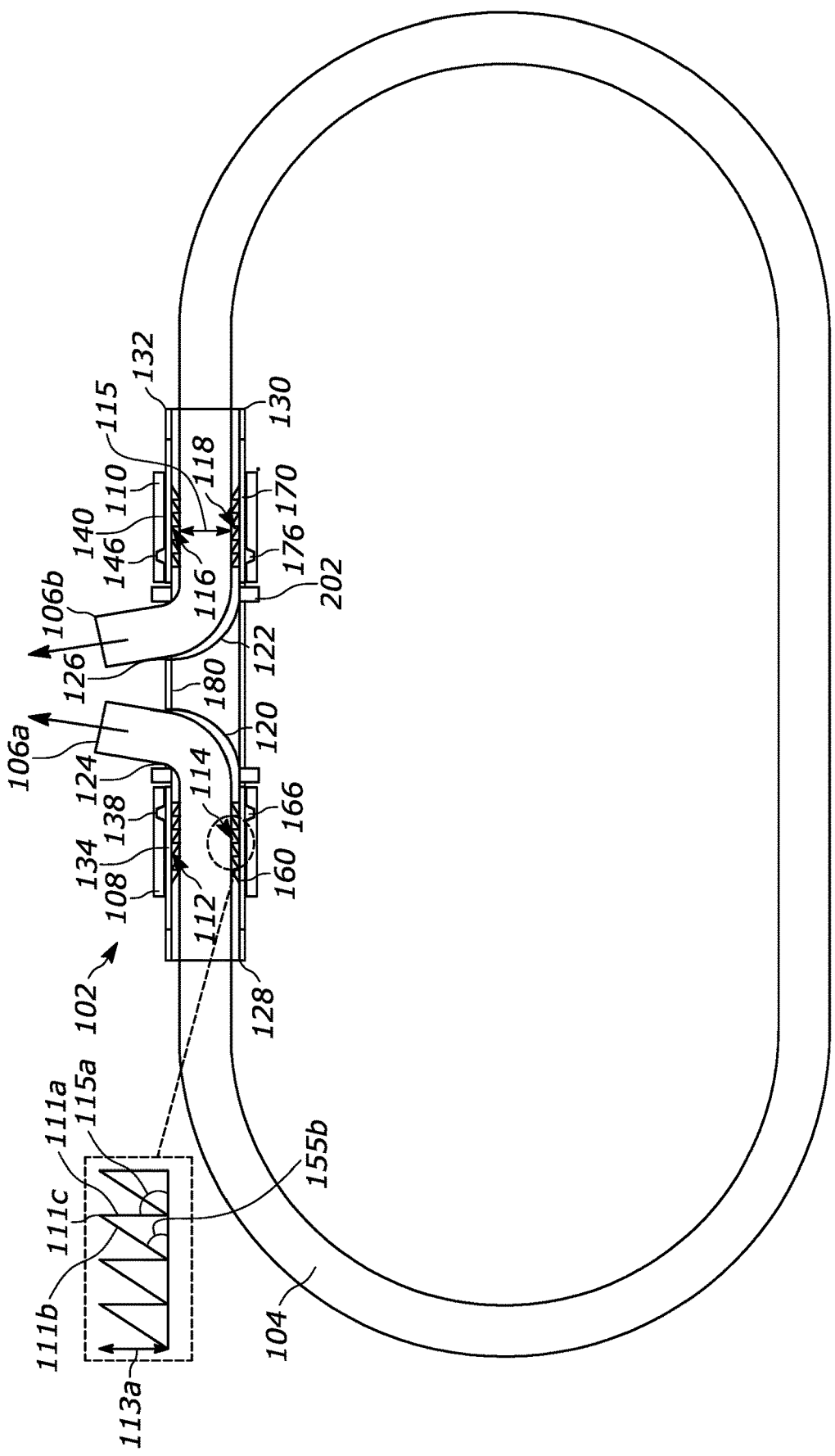
FIG. 6 is a cross-section view of the locking mechanism and cord of FIG. 1A along section lines 6-6 constructed in accordance with one embodiment of the disclosure.
Figure 9A:
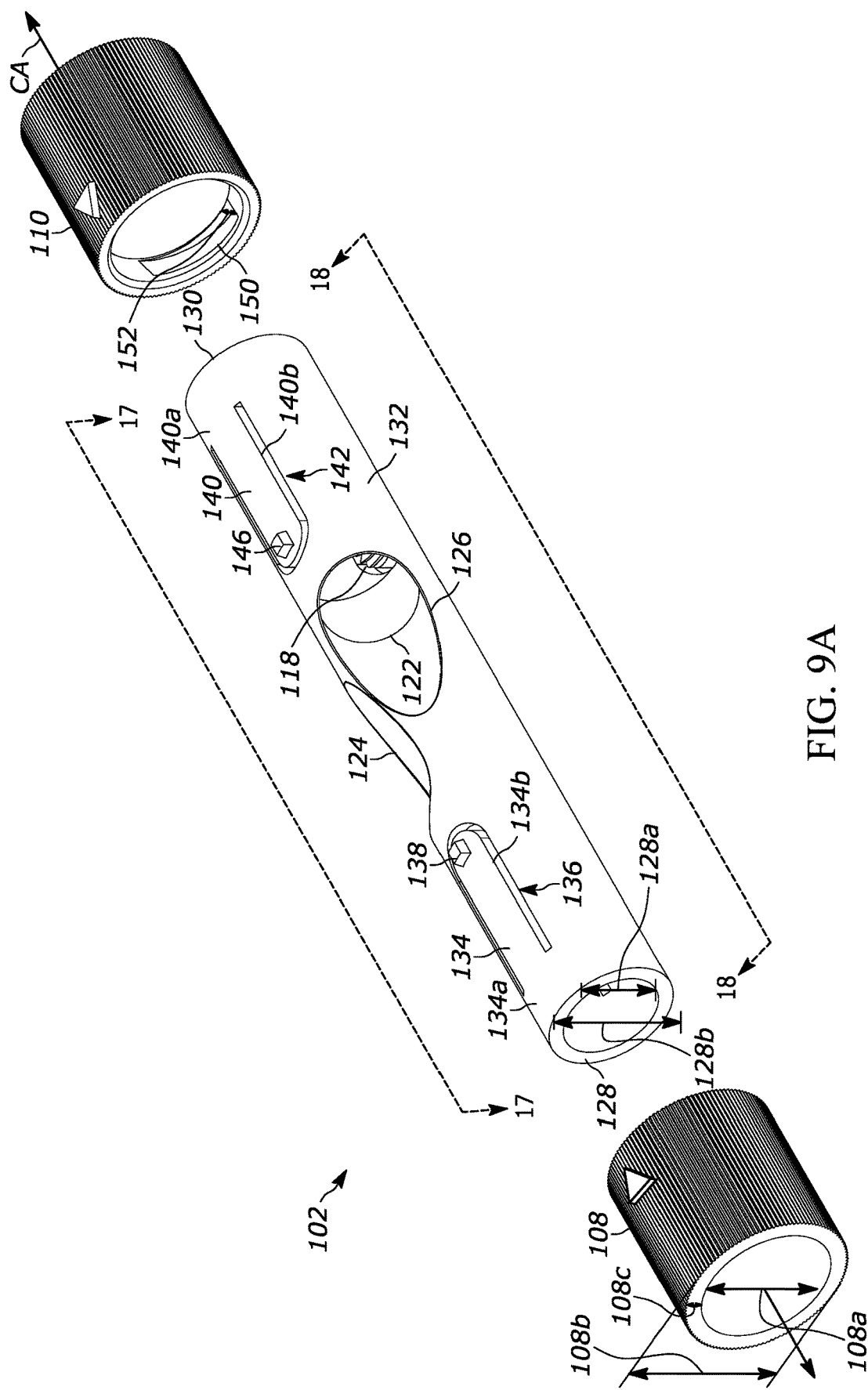
FIG. 9A is an exploded view of FIG. 7.

As shown in the illustrated example embodiment of FIGS. 6 and 9A, the body 132 comprises a body inner diameter 128a and the body outer diameter 128b, wherein an uncompressed diameter 111 of the cord 104 (see FIG. 8) is less than the body inner diameter 128a. The body 132 comprises first, second, third, and fourth tabs 134, 142, 162, 172 having respective pluralities of teeth 112, 114, 116, 118. Each tooth of the pluralities of teeth 112, 114, 116, 118 have pointed ends 111c that extend into the hollow tubes 103, 105 and toward the separation portion 180. Responsive to the cord 104 being inserted through the hollow tubes 103, 105, and through the respective first and second arcuate openings 124, 126, an application of force to at least one of the first or second cord ends 106a, 106b of the cord 104 results in a tightening of the cord around the pipe sections 12, 14 (see FIG. 1B, 2B). The cord 104 travels through and toward the first and second arcuate opening 124, 126, without interacting with the pointed ends 111c of the pluralities of teeth 112, 114, 116, 118.

Figure 9B:
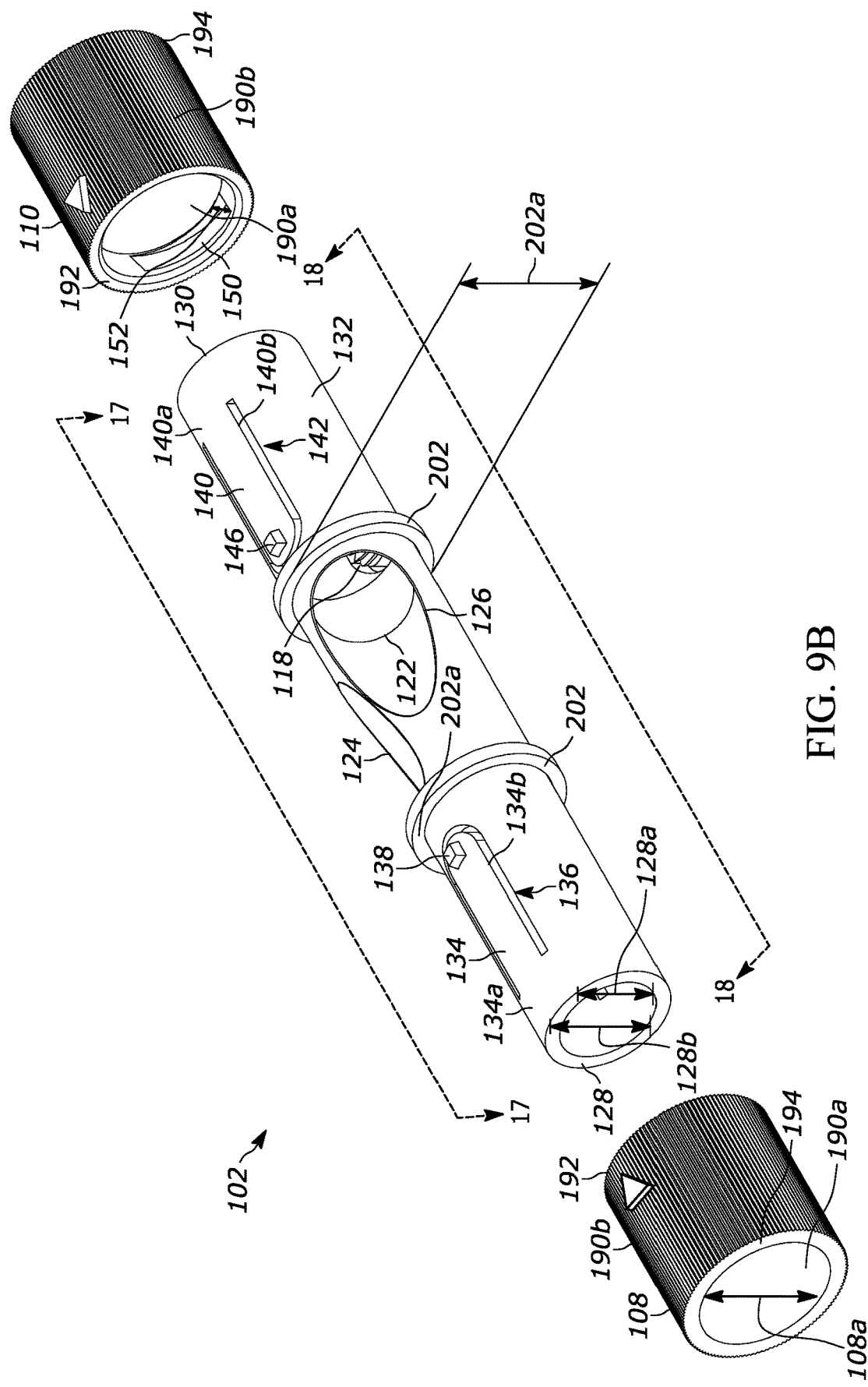
FIG. 9B is an exploded view of FIG. 7, wherein the locking mechanism includes a lip, in accordance with another embodiment of the present disclosure.
Figure 10:
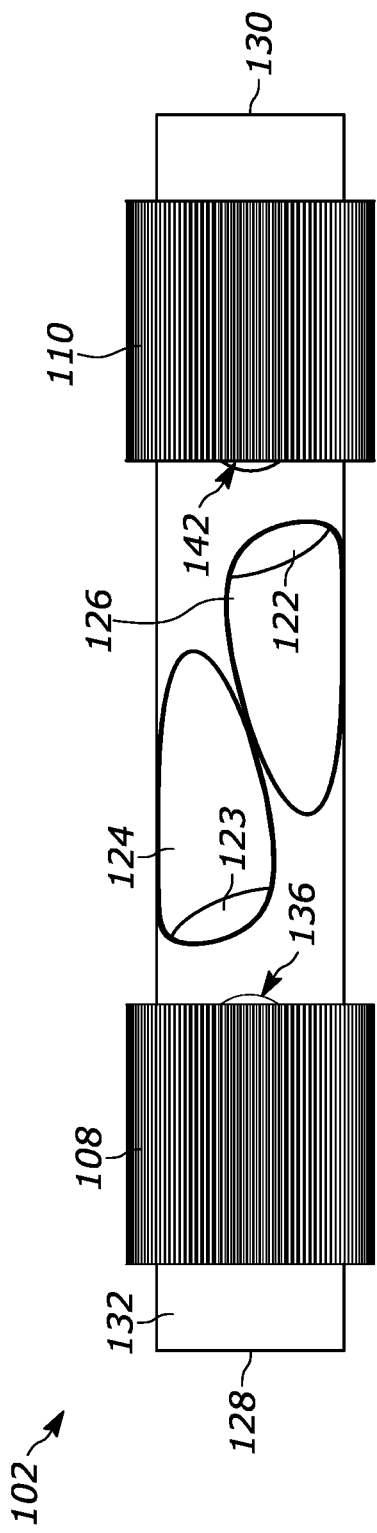
FIG. 10 is a top plan view of FIG. 7.
Figure 11:
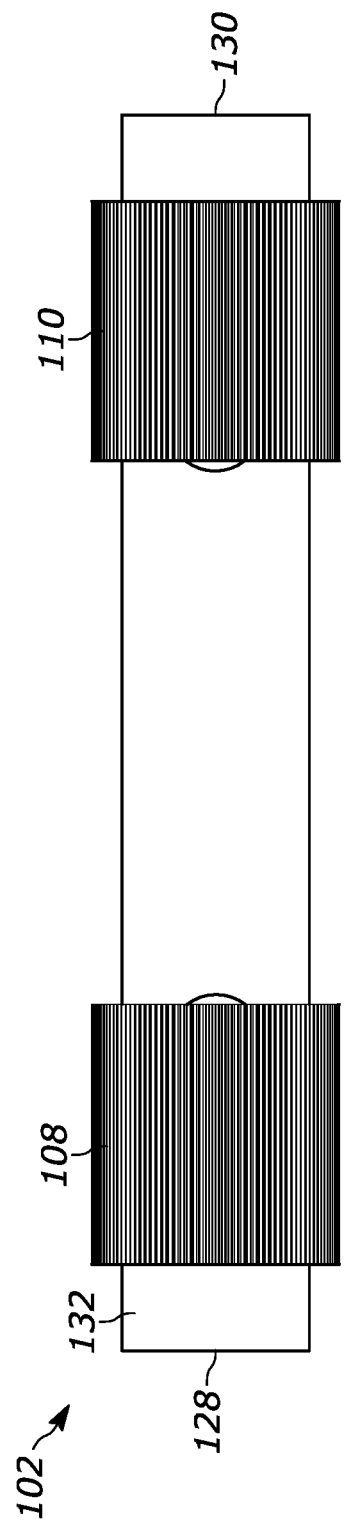
FIG. 11 is a bottom plan view of FIG. 7.
Figure 12:
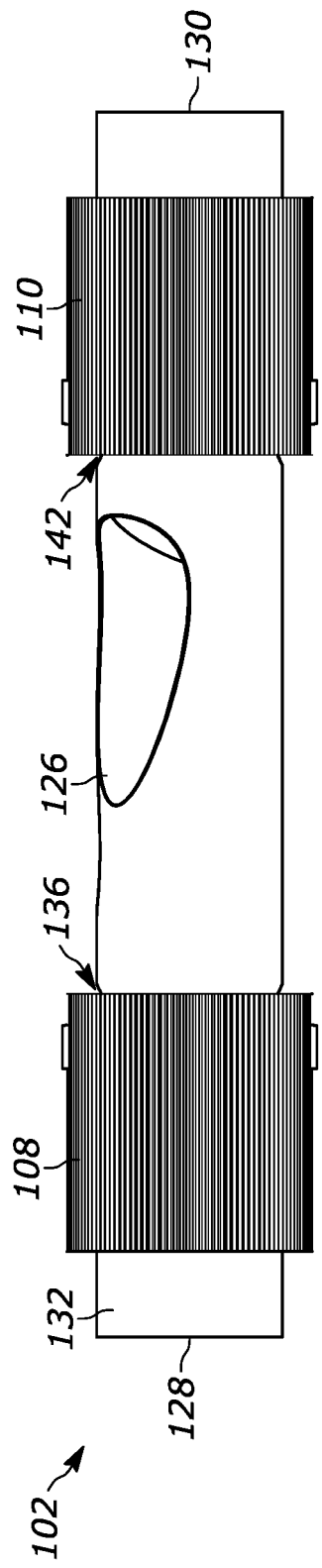
FIG. 12 is a side elevation of FIG. 7.
Figure 14:
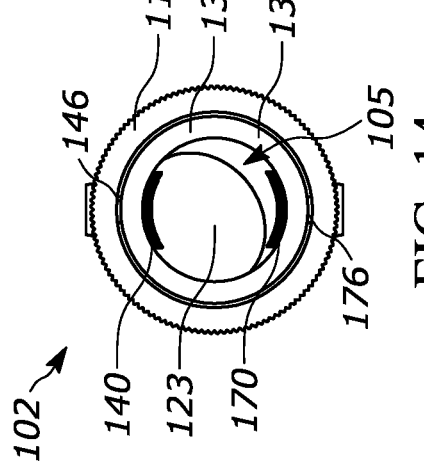
FIG. 14 is a rear elevation of FIG. 7.
Figure 13:
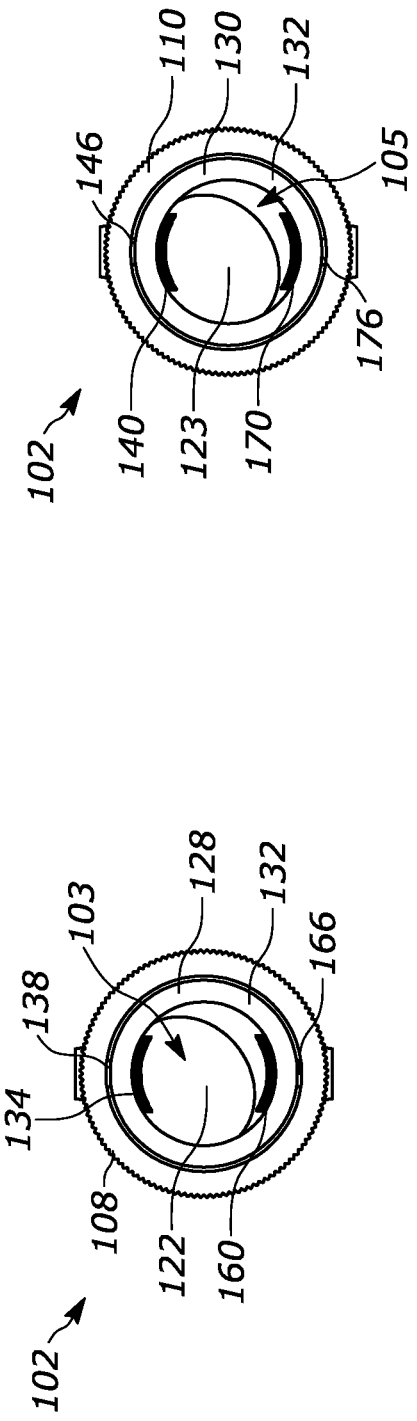
FIG. 13 is a front elevation of FIG. 7.

As shown in the illustrated example embodiment of FIGS. 6 and 9B, the body 132 additionally comprises one or more lips 202. In this embodiment, the lips 202 are located between tabs 134, 140, 160, 170 and the first and second arcuate opening 124, 126. The lips 202 extend radially around the circumference of the body 132. The lips 202 have a lip diameter 202a that is greater than the outer body diameter 128b of the caps 108, 110. The lips 202 act as a boss to locate and stop the caps 108, 110 during positioning and advancing of the caps. Additionally, the lips 202 create space between an outer surface of the body 132, such that the caps 108, 110 can slide toward and away from the arcuate openings 124, 126 during use, and when the cord 104 is pulled taught.

The cord 104 comprises one of nylon, metal wire, fibers, and/or the like. The cord 104 has a tensile strength ranging between 1000 psi and 3000 psi. The cord 104 has the uncompressed diameter 111 and a compressed diameter 115, wherein the cord returns to the uncompressed diameter absent a force. The cord 104 does not spontaneously loosen (e.g., move in a rearward direction away from the first and second arcuate openings 124, 126) because the pointed ends 111c of pluralities of teeth 112, 114, 116, 118 will interact with said cord to prevent rearward motion, especially when the caps 108, 110 are engaged and/or in the locking position. Thus, circumferential pressure is applied to create or further define the trough 51, which increases the durability and coupling ability of the pipe coupling assembly 10.

Tabs 134 140, 160, 170

In the illustrated example embodiments of FIGS. 6, 9A-9B, 15-19, the first tab 134 is directly opposite the second tab 160 across the hollow tube 103, and the third tab 140 is directly opposite the fourth tab 170 across the hollow tube 105. The first tab 134 is directly opposite the third tab 140 along the common axis and across the first and second arcuate opening 124, 126, such that the first and second openings are at least partially between the first and third tab. The second tab 160 is directly opposite the fourth tab 170 along the common axis. It would be appreciated by one having ordinary skill in the art, that the tabs 134, 140, 160, and 170 could be in various configurations, and are contemplated herein.

Figure 15:
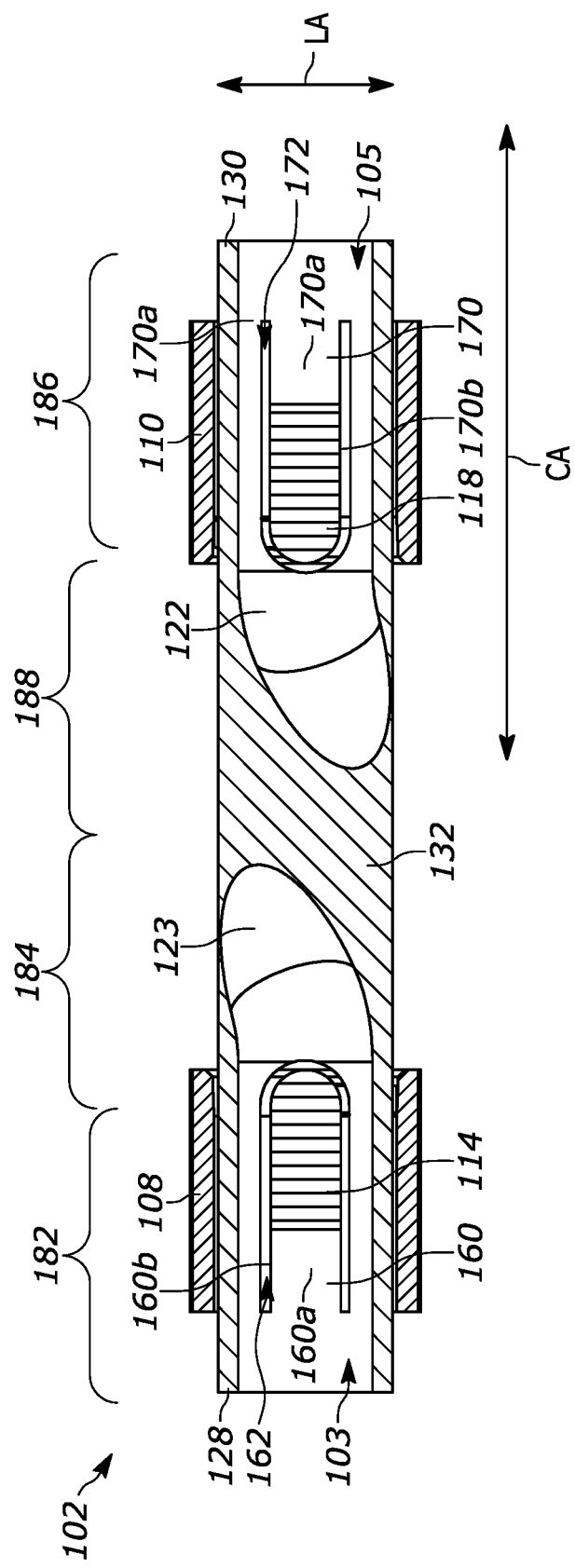
FIG. 15 is a cross-section view taken along lines 15-15 of FIG. 7.

The body 132 defines first and second tab openings 136, 162 wherein the first tab 134, and the second tab 160 reside within the first and second openings, respectively, and are supported by first and second tab connections 134a, 160a, respectively (see FIG. 9A-9B, 15). The first and second tabs 134, 160 pivot into and out of the hollow tube 103 via support from the first and second tab connections 134a, 160a. In this example embodiment, the first and second tab openings 136, 162 conform to the shape of the first and second tabs 134, 160, wherein the first and second tabs extend along the common axis CA. Stated another way, peripheral edges 134b, 160b of the first and second tabs 134, 160 maintain a constant distance (when not flexed) from the first and second tab openings 136, 162, respectively, wherein the constant distance comprises between 1 mm to about 5 cm (see FIG. 9A-9B, 15).

Figure 16:
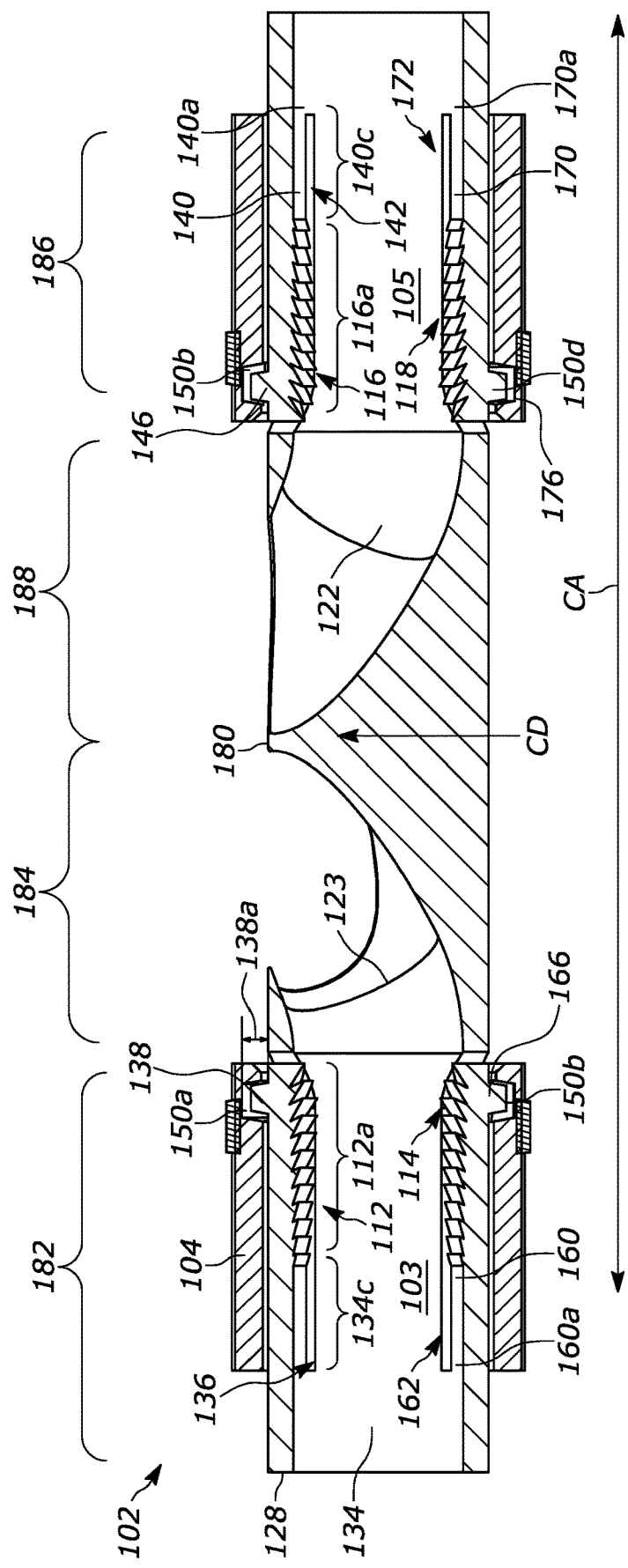
FIG. 16 is a cross-section view taken along lines 16-16 of FIG. 7.

As illustrated in FIG. 16, the first tab 134 comprises a plurality of teeth 112 in a toothed section 112a and smooth surface in a smooth section 134b. The toothed section 112a is nearer the arcuate opening 124 along the common axis CA, and the smooth section 134c connects the toothed section 112a to the first tab connection 134a. The pivoting ability of the first tab 134 allows the toothed section 112a the greatest pivoting arc of the first tab. The second tab 160 mirrors the first tab 134 across the common axis CA and has substantially the same configuration as described above with regard to the first tab 134. The first and second tabs 134, 160 have first and second locking protrusions 138, 166 on an outer surface of the respective tabs, wherein the plurality of teeth 112, 114 are comprised on an inner surface, opposite the outer surface. The first and second locking protrusions 138, 166 extend a protrusion height 138a from the outer surface of their respective tabs. A force exerted on the first and second locking protrusions 138, 166 pivots the first and second tabs 134, 160 into the hollow tube 103. In an alternative embodiment, the motion or locking of the first and second locking protrusions 138, 166 into the caps 108, 110 is similar to a bayonet connection.

The body 132 defines third and fourth tab openings 142, 172 wherein the third and fourth tabs 140, 170 resides within the third and fourth openings, respectively, and are supported by third and fourth tab connections 142a, 172a, respectively. The third and fourth tabs 140, 170 pivot into and out of the hollow tube 105 via support from the third and fourth tab connections 142a, 172a. In this example embodiment, the third and fourth tab openings 142, 172 conforms to the shape of the third and fourth tabs 140, 170, wherein the third and fourth tabs extend along the common axis CA. Stated another way, peripheral edges 140b, 160b of the first and second tabs 134, 160 maintain a constant distance (when not flexed) from the first and second tab openings 136, 162, respectively, wherein the constant distance comprises between 1 mm to about 5 cm (see FIGS. 9A-9B, 15).

The third tab 140 comprises a plurality of teeth 114 in a toothed section 114a and smooth surface in a smooth section 140b. The toothed section 114a is nearer the arcuate opening 126 along the common axis CA, and the smooth section 140c connects the toothed section 114a to the third tab connection 140a. The pivoting ability of the third tab 140 allows the toothed section 114a the greatest pivoting arc of the third tab. The fourth tab 170 mirrors the third tab 140 across the common axis CA and has substantially the same configuration as described above with regard to the third tab 140. The third and fourth tabs 140, 170 have third and fourth locking protrusions 146, 176 on an outer surface of the respective tabs, wherein the plurality of teeth 116, 118 are comprised on an inner surface, opposite the outer surface. The third and fourth locking protrusions 146, 176 extend the protrusion distance 138a (see FIG. 16) from the outer surface of their respective tabs. A force exerted on the third and fourth locking protrusions 146, 176 pivots the third and fourth tabs 140, 170 into the hollow tube 105. Although four tabs are disclosed, a person having ordinary skill in the art would understand that more or less tabs are contemplated.

Plurality of Teeth 112, 114, 116, 118

As illustrated in the example embodiment of FIGS. 6, 16-19, the plurality of teeth 112, 114, 116, 118 are made from a same material as the body 132. In another example embodiment, the plurality of teeth 112, 114, 116, 118 are made from a different material than the body 132, and comprises nylon, metal, and/or polymers, including flexible polymers. In another example embodiment, the plurality of teeth 112, 114, 116, 118 are formed by molding, machining, forging, and/or 3D printing. In one example embodiment, the plurality of teeth 112, 114, 116, 118 extend a uniform distance away from the inner surface of respective tabs 134, 140, 160, 170, as illustrated in FIG. 6.

Figure 17:
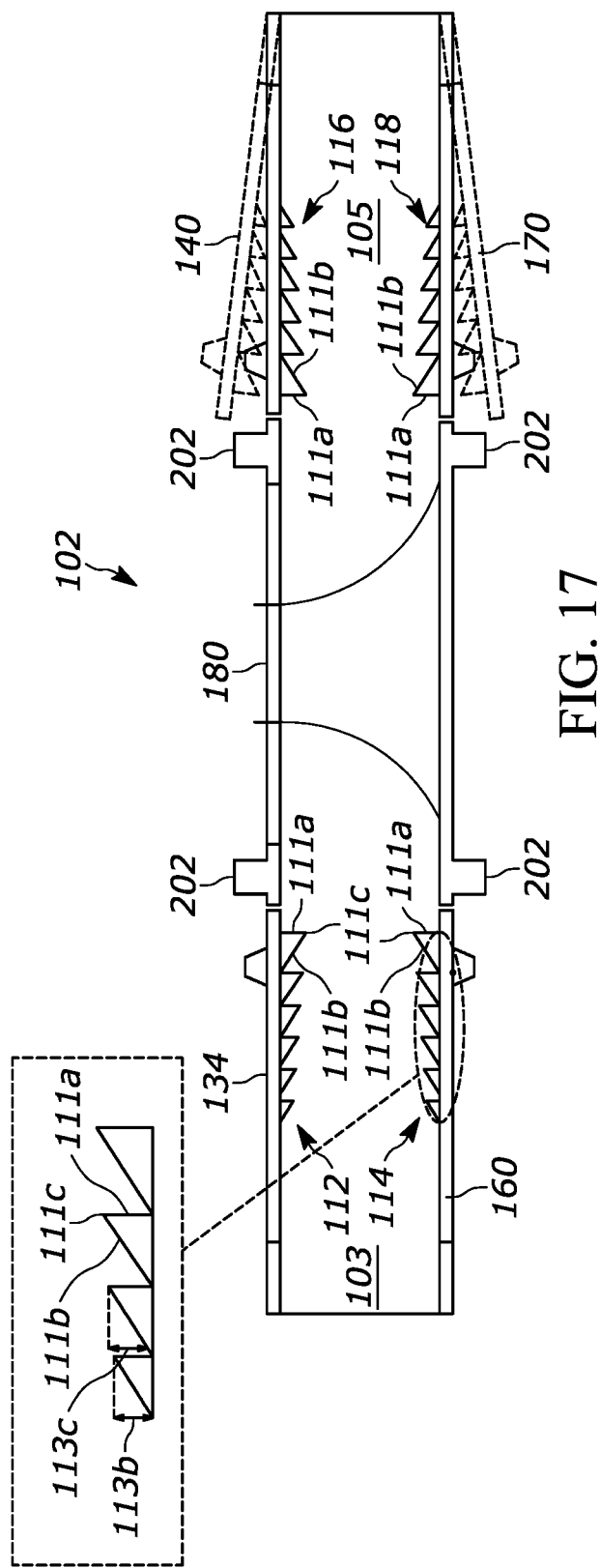
FIG. 17 is a cross-section view taken along lines 17-17 of FIG. 9B.
Figure 18:
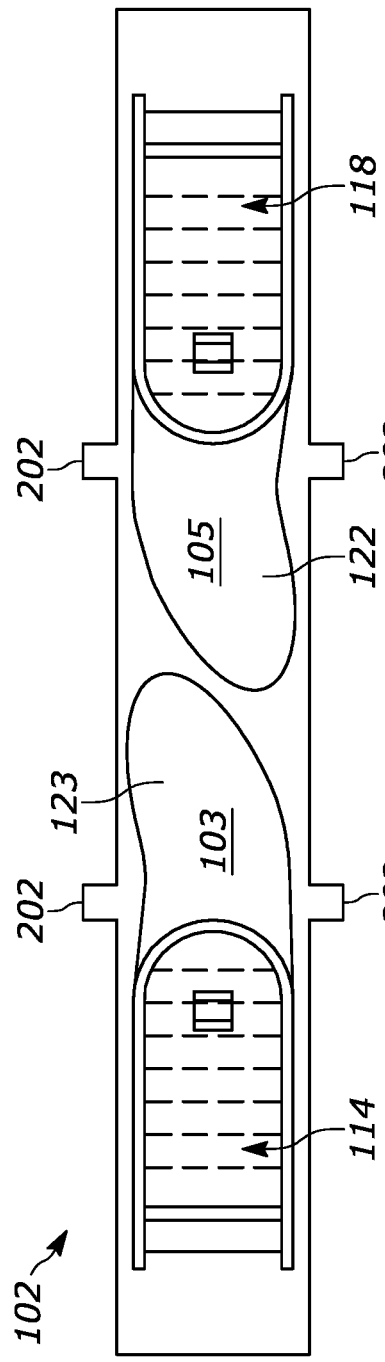
FIG. 18 is a cross-section view taken along lines 18-18 of FIG. 9B.

In another example embodiment, the plurality of teeth 112, 114, 116, 118 extend incremental distances (e.g., wherein a first incremental distance 113b is less than second incremental distance 113c, etc.) away from the inner surface of respective tabs 134, 140, 160, 170, as illustrated in FIG. 17. In one example embodiment, the incremental distance increases as a function of a single tooth of the plurality of teeth's 112, 114, 116, 118 proximity to the separation portion 180 on a respective tab 134, 140, 160, 170. Wherein the distance a respective tooth extends increases as the tooth's proximity to the separation portion 180 increases. Stated another way, the tooth extending a farthest distance from the inner face of a respective tab 134, 140, 160, 170 is positioned on a location that has greatest pivoting arc of the respective tab (see FIG. 19). The incremental distances 113b, 113c, and the uniform distance are between about 1 mm to about 5 mm. It would be appreciated by one of ordinary skill in the art that multiple tooth length are contemplated.

As shown in the example embodiment of FIGS. 6 and 17, the pluralities of teeth 112, 114, 116, 118 extend away from the body 132, the teeth having a front face 111a, a pointed end 111c, and a rear face 111b. The front face 111a is nearest the first or second arcuate opening 124, 126, respectively, and the rear face 111b is farthest from the first or second arcuate opening, respectively. The front face 111a extends away from the body 132 at a front face angle 115a. In one example embodiment, the front face angle 115a is about a 90° angle. In another example embodiment, the front face angle 115a is between about 90° and 135°. The rear face 111b extends away from the body 132 at a rear face angle 115b. In one example embodiment, the rear face angle 115b is about a 45° angle. In another example embodiment, the rear face angle 115b is between about 15° and 50°.

Figure 19:
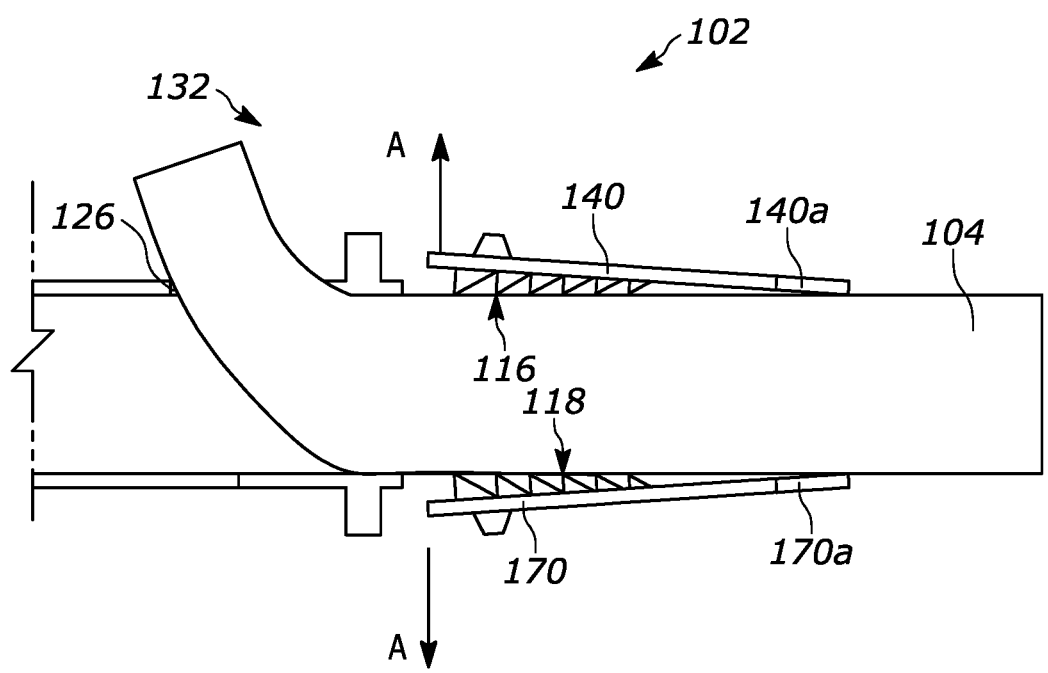
FIG. 19 is a magnified view of FIG. 17 wherein a portion of a cord is being inserted into the locking mechanism, in accordance with one embodiment of the present disclosure.

When in use and being tightened, the cord 104, moving toward the accurate openings 124, 126, slides over the rear faces 111b and does not engage the pointed ends 111c of the plurality of teeth 112, 114, 116, 118 because of the rear face angle 115b and the cords direction of travel. In this example embodiment, the tabs 134, 140, 160, 170 are pushed away from the cord 104 by the force of the cord traveling toward the first and second arcuate openings 124, 126, and flex at the respective tab connections 134a, 140a, 160a, 170a. As illustrated in FIG. 19, this flexion allows for easy passage of the cord 104 through the first or second hollow tubes 103, 105.

In the example embodiment of FIG. 19, the third and fourth tabs 140, 170 are pivoted outwardly by a force A created by the interaction of the cord 104 and the rear face 111c of the plurality of teeth 116, 118. In this embodiment, the incremental distances are such that at least a portion of each rear face 111c of the plurality of teeth 116, 118 is in contact with the cord 104. This disperses the force A created by the cord's 104 travel toward the arcuate opening 126 evenly over the plurality of teeth 116, 118 reducing friction and the likelihood of a snag. The first and second tabs 134, 160 function in substantially the same way as the third and fourth tabs 140, 170 described with regard to FIG. 19.

The Hollow Tubes 103, 105

As shown in the example embodiments of FIGS. 15 and 16, the hollow tubes 103, 105 comprise first and second lower portions 182, 186 that extend along the common axis CA, and first and second upper portion 184, 188 that are respectively skewed relative to the common axis CA. The first and second lower portions 182, 186 connect the first and second ends 128, 130 to the first and second upper portions 184, 188, and the first and second upper portions connect the first and second lower portions to the first and second arcuate openings 124, 136.

The first and second lower portions 182, 186 are substantially cylindrical. In this example embodiment, the first lower portion 182 extends from the first body end 128 to be more than or even with a location of the first and second openings 136, 162 that is nearest the first arcuate opening 124. The second lower portion 186 extends from the second body end 130 to be more than or even with a location of the third and fourth openings 140a, 170a that is nearest the second arcuate opening 126. The plurality of teeth 112, 114, 116, 118 extend into the first and second lower portions 182, 186, respectively.

As shown in the illustrated example embodiment of FIGS. 15 and 16, the first and second upper portions 184, 188 skew away from each other along a latitudinal axis LA as arced portions 123, 122, respectively, extend in a common direction CD away from the common axis CA. This advantageously allows an easy grip of the cord 104, as the cord ends 106a, 106b are positioned to extend away from the body 132 and away from each other. The first and second upper portions 184, 188 have an upper diameter that substantially the same, or greater than a lower diameter of the first and second lower portion 182, 184. The first and second arcuate openings 124, 126 have a same or greater diameter as the upper diameter.

Locking Caps 108, 110

As shown in the illustrated example embodiment of FIGS. 9A-9B, the first and second locking caps 108, 110 comprise substantially hollow cylindrical tubes. The first and second locking caps 108, 110 comprise one of plastic, metal, nylon and/or the like. The first and second locking caps 108, 110 are formed by molding, injection molding, welding, machining, forging, 3D printing, and/or the like. In one example embodiment, the first and second locking caps 108, 110 include an inner surface 190a and an outer surface 190b. In another example embodiment, the outer surface 190b is textured, including channels, bumps, striations, or the like, that increase a user's ability to grip the locking caps 108, 110. The inner surface 190a is substantially smooth. The locking caps 108, 110 comprise inner locking diameters 108a and outer locking diameter 108b. The inner locking diameter 108a is between 1 mm and 10 mm greater than the body outer diameter 128b. The locking caps 108, 110 comprises a locking thickness 108c that is between 10 mm to about 50 mm. The outer locking diameter 108b is less than the lip diameter 202a of the lip 202.

In one example embodiment, the inner surface 190a defines at least one locking slot 150. The locking slot 150 includes an arced trough that extends perpendicularly to the common axis CA. The arced trough is defined by sidewalls, wherein a first depth of the trough is less than a locking depth 152 of the trough. The locking slot 150 comprises a width that is substantially the same as or larger than a width (measured along the longitudinal axis LA, see FIG. 16) of the locking protrusions 138, 146, 166, 176. The locking depth 152 is substantially the same as or larger than a protrusion height 138a of the locking protrusions 138, 146, 166, 176, respectively. The at least one locking slot 150 is positioned to interact with the locking protrusions 138, 146, 166, 176. In one example embodiment, there are two locking slots 150 formed in each of the locking caps 108, 110. In this example embodiment, the locking slots 150 are located directly across from each other.

As illustrated in the example embodiments of FIG. 9B, the locking caps 108, 110 include a leading end 192 and a trailing end 194, wherein the locking cap is inserted leading end first onto the first or second body end 128, 130. In one example embodiment, the leading end 192 of the locking caps 108, 110 is slidably coupled to the body 132, such that the locking cap rests on the first or second body end 128, 130 without contacting the tabs 134, 140, 160, 170. The locking caps 108, 110 can then be pushed toward the separation point 180 until the locking slot 150 interacts with and/or houses the respective locking protrusion 138, 146, 166, 176.

As illustrated in the example embodiment of FIGS. 1A, 1B, and 8, when in use, the cord 104 extends around the pipe sealing assembly 10 and the first and second pipe sections 12, 14, goes through the body 132 and the first and second cord ends 106a, 106b exit out of the first and second arcuate openings 124, 126. Once sufficiently tightened, the locking caps 108, 110 are slid toward the separation section 180 into a locked position. The locked position comprises wherein the locking caps meet the lip 202, interlock with the locking protrusions 138, 146, 166, 176, or both. The locking caps 108, 110 prevent the tabs 134, 140, 160, 170 from flexing outwardly (e.g., as they do when the cord 104 is travelling from the first or second body end 128, 130 to the first or second arcuate opening 124, 146). The lack of outward flexion and the rear face angle 115b of the plurality of teeth 112, 114, 116, 118 causes the plurality of teeth to snag the cord and prevent reward movement. In some embodiments, where, for example, particularly tight interaction between the cord 104 and the pipe sections 12, 14 is needed, the lip 202, having the larger diameter than the outer locking diameter 108b, raises the body 132 slightly off the surface of the pipe coupling assembly 10, allowing for easy forward (e.g., toward the separation portion 80) and rearward (e.g., away from the separation portion) movement of the locking caps 108, 110 along the body.

The locking mechanism 102 and the cord 104 advantageously provide for a low cost, low effort way to add circumferential tension to increase a seal between the first and second pipe sections 12, 14 and/or breaks in single pipe section. The plurality of teeth 112, 114, 116, 118 allow the cord 104 to be tightened around the pipe coupling assembly 10 and the pipe sections 12, 14 without having to use screws or tools. Further, the cord 104 can be tightened incrementally, while the presence of the plurality of teeth 112, 114, 116, 118 prevent the cord from spontaneously loosening, or releasing itself from around the pipe coupling assembly 10.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The complete disclosure of the patents, patent documents, and publications identified herein are incorporated by reference in their entirety as if each were individually incorporated. To the extent there is a conflict or discrepancy between this document and the disclosure in any such incorporated document, this document will control.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A locking mechanism for use with a coupler assembly for sealing pipe comprising:
    a partially hollow cylindrical body having a first end opposite a second end along a common axis, the body defining:
        a first cord path connecting the first end to a first arcuate opening defined in the body; and
        a second cord path connecting the second end to a second arcuate opening defined in the body, wherein the first cord path and the second cord path comprise separate paths; and
    first and second caps that are slidably attachable to the first and second ends of the body, respectively.

2. The locking mechanism of claim 1 wherein said body comprises:
    a first tab and a second tab along the first cord path, the first and second tab each comprising a plurality of teeth that extend into the first cord path; and
    a third tab and a fourth tab along the second cord path, the third and fourth tab each comprising a plurality of teeth that extend into the second cord path.

3. The locking mechanism of claim 2 wherein at least one of the first, second, third, and fourth tabs are flexibly connected to the body, wherein responsive to a force directed into the body, the tab flexes into the body and responsive to force directed out of the body the tab flexes out of the body.

4. The locking mechanism of claim 1 comprising a cord having a first end portion located within the first cord path and a second end portion located within the second cord path.

5. The locking mechanism of claim 1 comprising the first cord path being separated from the second cord path by a separation location.

6. The locking mechanism of claim 1 comprising the first cord path comprising a first upper portion connected to a first lower portion, the first lower portion defining a substantially linear path from the first end to the upper portion along the common axis and the first upper portion defining a skewed path that extends from the first lower portion away from the common axis in a common direction to the first arcuate opening.

7. The locking mechanism of claim 6 comprising the second cord path comprising a second upper portion connected to a second lower portion, the second lower portion defining a substantially linear path along the common axis from the second end to the second upper portion and the second upper portion defining a skewed path that extends from the second lower portion away from the common axis in the common direction to the second arcuate opening, wherein the first upper portion skews along a longitudinal axis away from the second upper portion, wherein the longitudinal axis is transverse to the common axis and the common direction.

8. The locking mechanism of claim 7 wherein the longitudinal axis is perpendicular to the common axis and the common direction and the common axis is perpendicular the common direction.

9. The locking mechanism of claim 1, the partially hollow cylindrical body comprising first and second lips, the first lip spacing a first and second tab from the first arcuate opening and the second lip spacing a third and fourth tab from the second arcuate opening, the first lip spaced from the second lip by the first and second arcuate openings.

10. The locking mechanism of claim 1, said body comprising a first tab and a second tab along the first cord path, the first and second tab each comprising a locking protrusion and a third tab and a fourth tab along the second cord path, the third and fourth tab each comprising a locking protrusion.

11. The locking mechanism of claim 10, the first and second caps defining first and second locking slots, the first and second locking slots configured to house the respective locking protrusions responsive to the first and second caps being slidably attached to the body in a locked position.

12. The locking mechanism of claim 1, said body comprising a first tab and a second tab along the first cord path, the first and second tabs extend along the common axis and reside within first and second openings defined by the body, the first and second tabs are coupled the body by tab connections, wherein the first and second openings are spaced from peripheral edges of the first and second tabs.

13. The locking mechanism of claim 12, responsive to a force over a force threshold said first and second tabs flex into the first cord path or away from the first cord path via the tab connections.

14. A method of making locking mechanism for use with a coupler assembly for sealing pipe, the method comprising the steps of:
    forming a partially hollow cylindrical body having a first end opposite a second end along a common axis;

defining first and second arcuate openings within the body;

forming within the body a first cord path connecting the first end to the first arcuate opening;

forming within the body a second cord path, separate from the first cord path, connecting the second end to the second arcuate opening;

forming a first tab coupled to the body and wherein responsive to a force over a force threshold being applied to the first tab, the first tab extends into and out of the first cord path; and forming a second tab that is coupled to the body and wherein responsive to the force over the force threshold being applied to the second tab, the second tab extends into and out of the second cord path.

15. The method of claim 14, comprising forming first and second caps that are slidably attachable to first and second ends of the body respectively, the first and second caps defining a locking mechanism that interacts with at least one of the first tab and the second tab.

16. The method of claim 14, wherein the forming a first tab comprises forming a plurality of teeth on a first tab surface facing into the first cord path and the forming a second tab comprises forming a plurality of teeth on a second tab surface facing into the second cord path.

17. The method of claim 14, wherein forming the first cord path comprises defining a first upper portion and a first lower portion, the defining the first lower portion comprising defining a substantially linear path along the common axis connecting the first end to the first upper portion and defining the first upper portion comprises defining a skewed path that connects the lower portion to the first arcuate opening and extends away from the common axis in a common direction to the first arcuate opening.

18. The method of claim 17, wherein forming the second cord path comprises defining a second upper portion and a second lower portion, the defining the second lower portion comprising defining a substantially linear path along the common axis that connects the second end to the second upper portion and the defining the second upper portion comprising defining a second skewed path that extends away from the common axis in the common direction and connects the second lower portion to the second arcuate opening, wherein the first upper portion skews along a longitudinal axis away from the second upper portion, wherein the longitudinal axis is transverse to the common axis and the common direction, and the common axis is transverse to the common direction.

19. A locking mechanism for use with a coupler assembly for sealing pipe comprising:

a partially hollow cylindrical body having a first end opposite a second end along a common axis, the body defining:

a first cord path connecting the first end to a first arcuate opening defined in the body;

at least one of a first tab and a second tab along the first cord path, the at least one of the first tab and the second tab comprising a plurality of teeth that extend into the first cord path, the at least one of the first tab and the second tab flexibly connected to the body, wherein responsive to a force directed into the body, the at least one of the first tab and the second tab flexes into the first cord path and responsive to force directed out of the body the at least one of the first tab and the second tab flexes out of the first cord path;

a second cord path connecting the second end to a second arcuate opening defined in the body, wherein the first cord path and the second cord path comprise separate paths; and at least one of a third tab and a fourth tab along the second cord path, the at least one of the third tab and the fourth tab comprising a plurality of teeth that extend into the second cord path, at least one of the third tab and the fourth tab flexibly connected to the body, wherein responsive to the force directed into the body, the at least one of the third tab and the fourth tab flexes into the second cord path and responsive to force directed out of the body the at least one of the third tab and the fourth tab flexes out of the second cord path, the at least one of a first tab and the second tab spaced from the at least one of the third tab and the fourth tab by the first and second arcuate openings.

20. The locking mechanism of claim 19 the first cord path comprising a first upper portion and a first lower portion, the first lower portion defining a substantially linear path along the common axis and the first upper portion defining a skewed path that extends away from the common axis in a common direction, the first upper portion connecting the first lower portion to the first arcuate opening, and the first lower portion connecting the first upper portion to the first end, the second cord path comprising a second upper portion and a second lower portion, the second lower portion defining a substantially linear path along the common axis and the second upper portion defining a skewed path that extends away from the common axis in the common direction, the second upper portion connecting the second lower portion to the second arcuate opening, and the second lower portion connecting the second upper portion to the second end wherein the first upper portion skews along a longitudinal axis away from the second upper portion, wherein the longitudinal axis is perpendicular to the common axis and the common direction and the common axis is perpendicular the common direction.

* * * * *